Dec. 27, 1966   J. V. O'NEILL ET AL   3,294,185
AUTOMATED WELL DRILLING APPARATUS
Original Filed Feb. 2, 1959   23 Sheets-Sheet 1
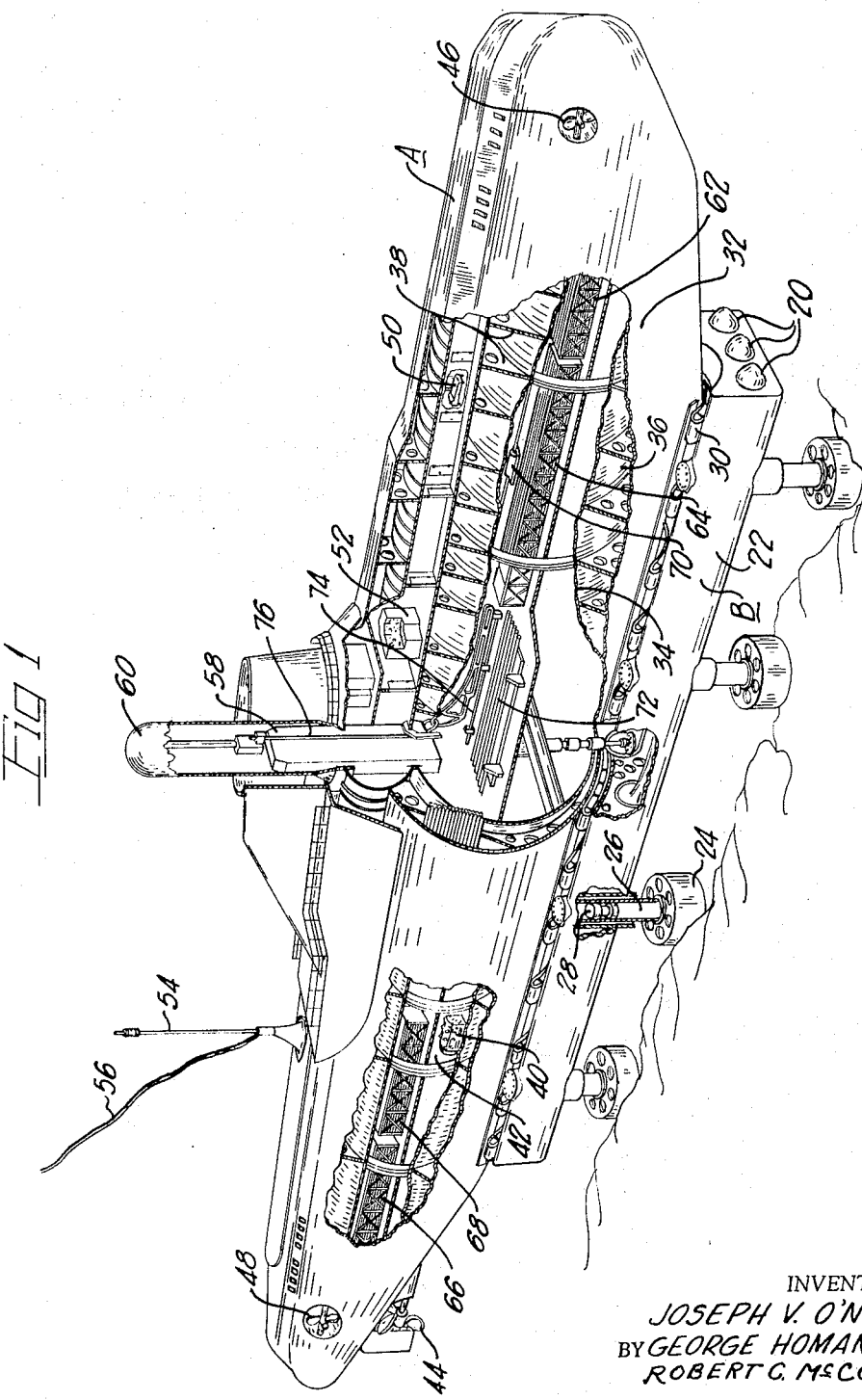
INVENTORS
JOSEPH V. O'NEILL
BY GEORGE HOMANICK
ROBERT C. McCORD
ATTORNEYS

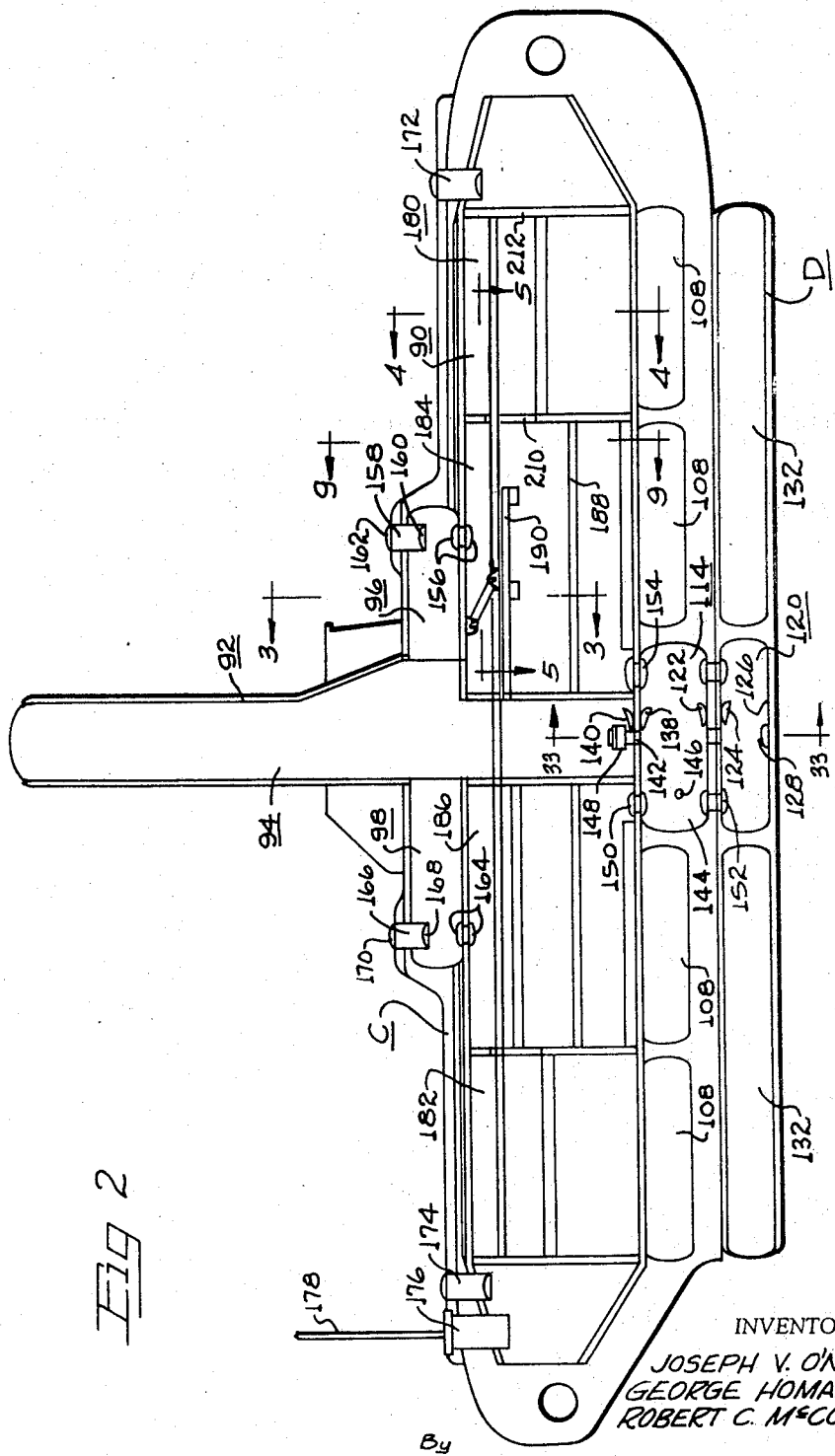

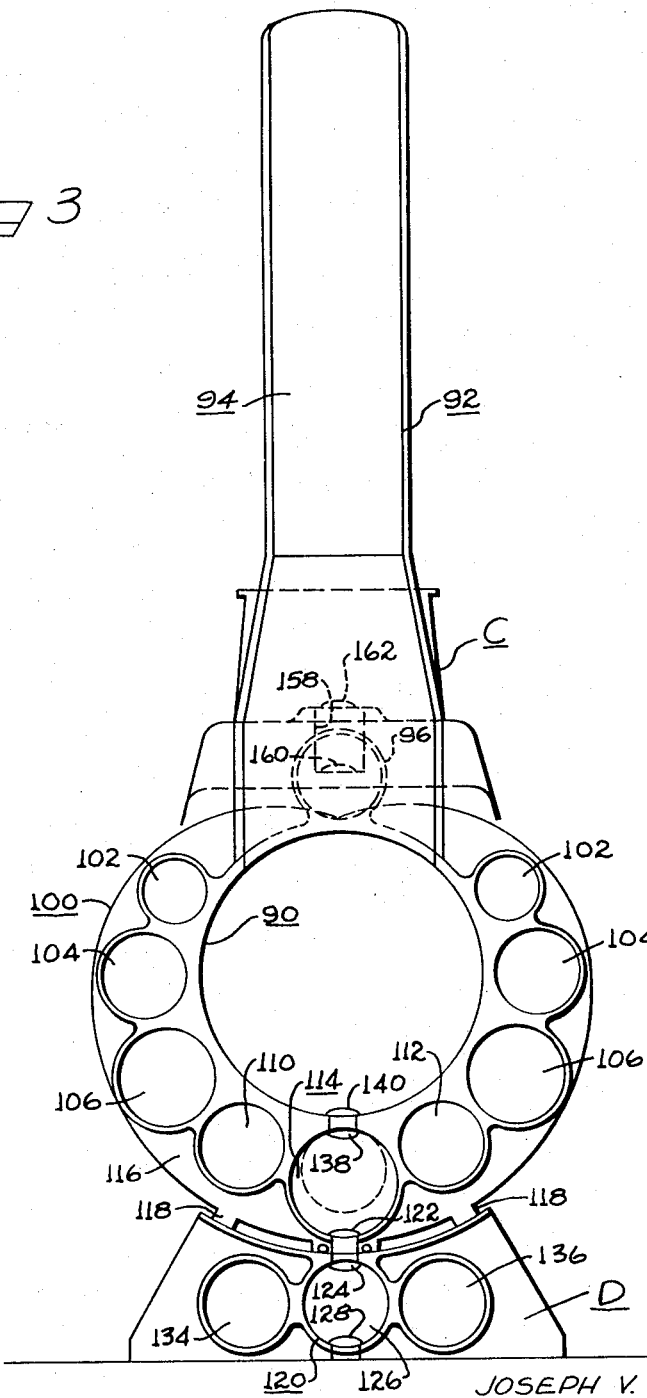

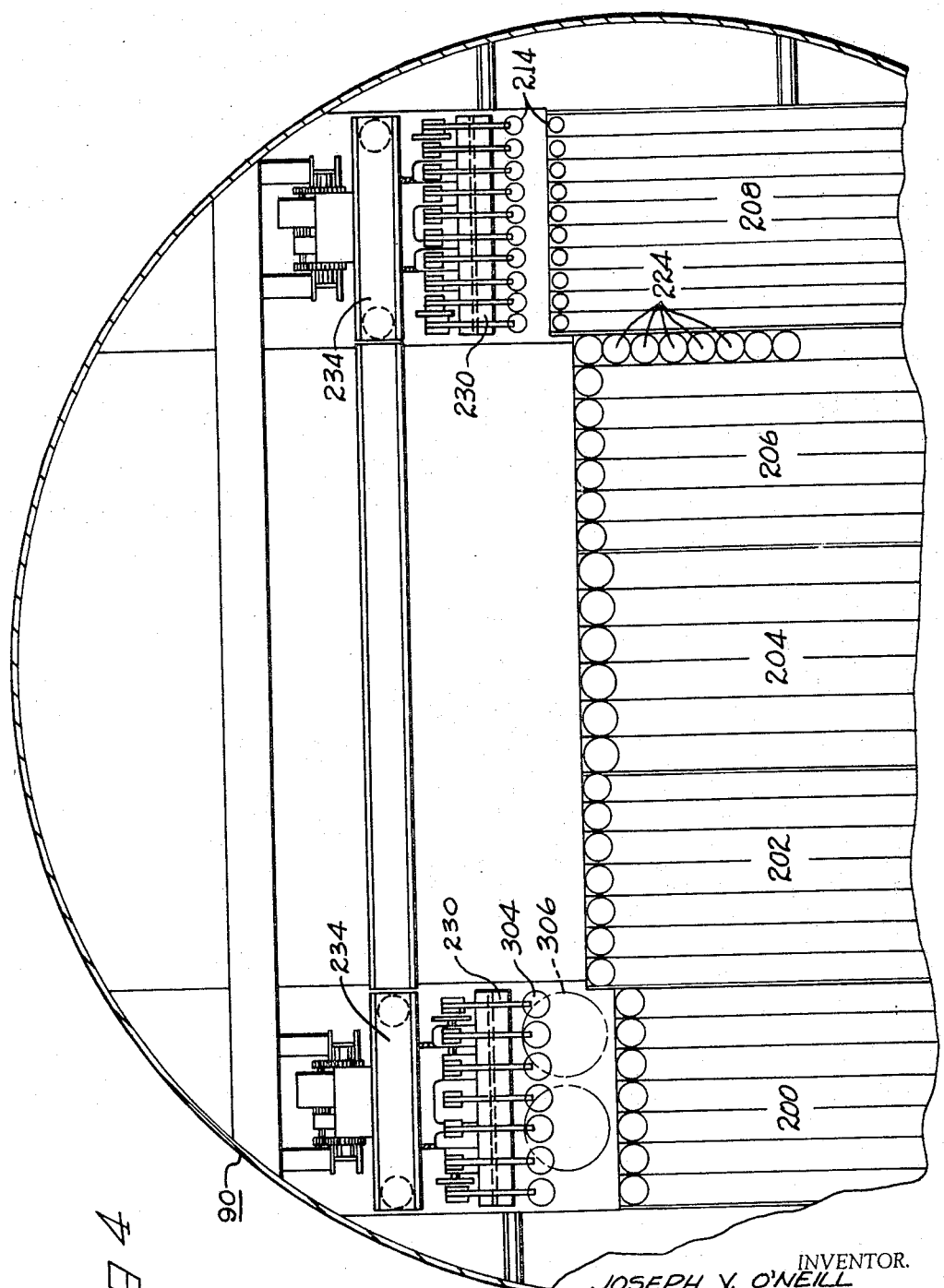

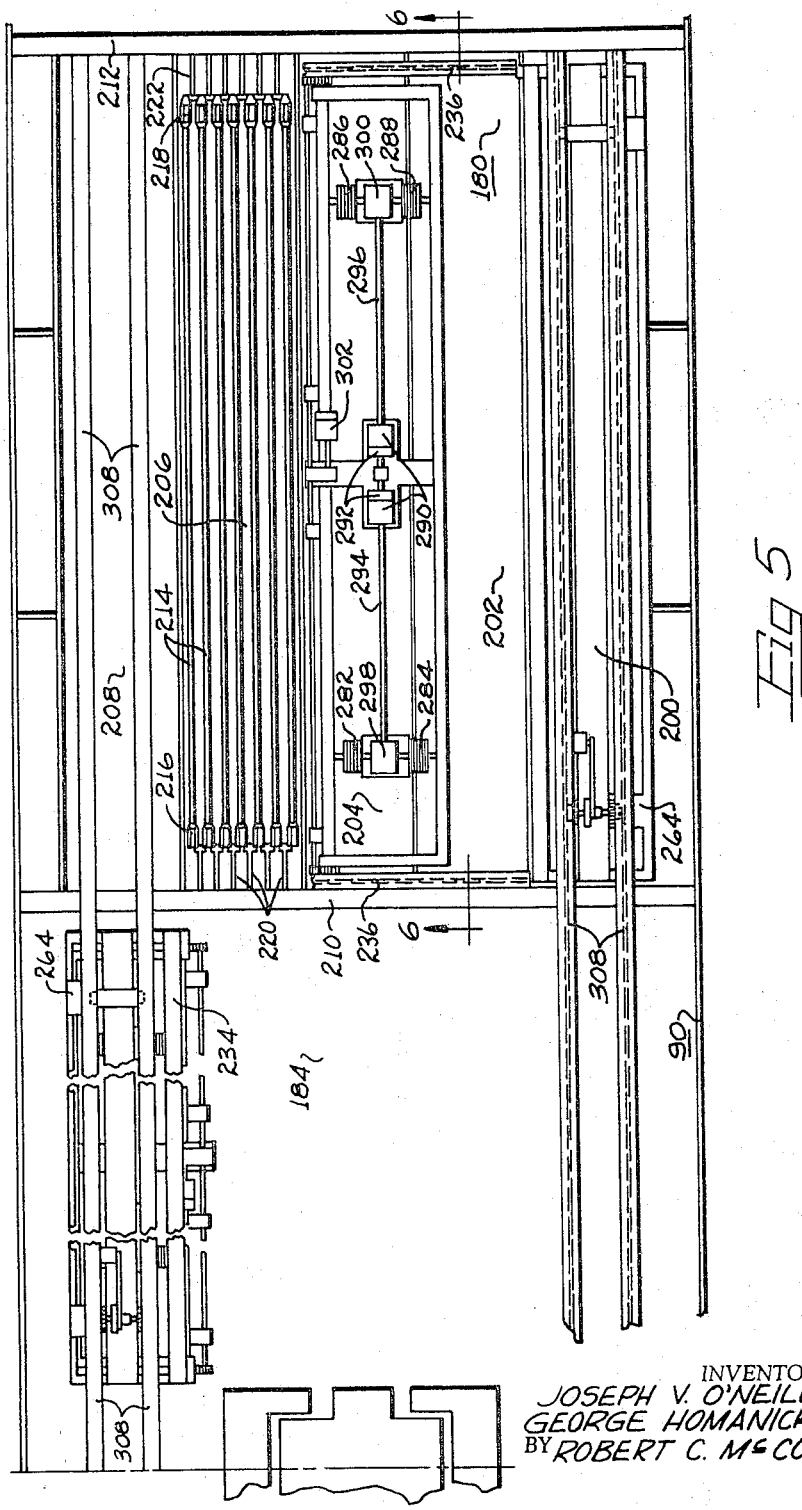

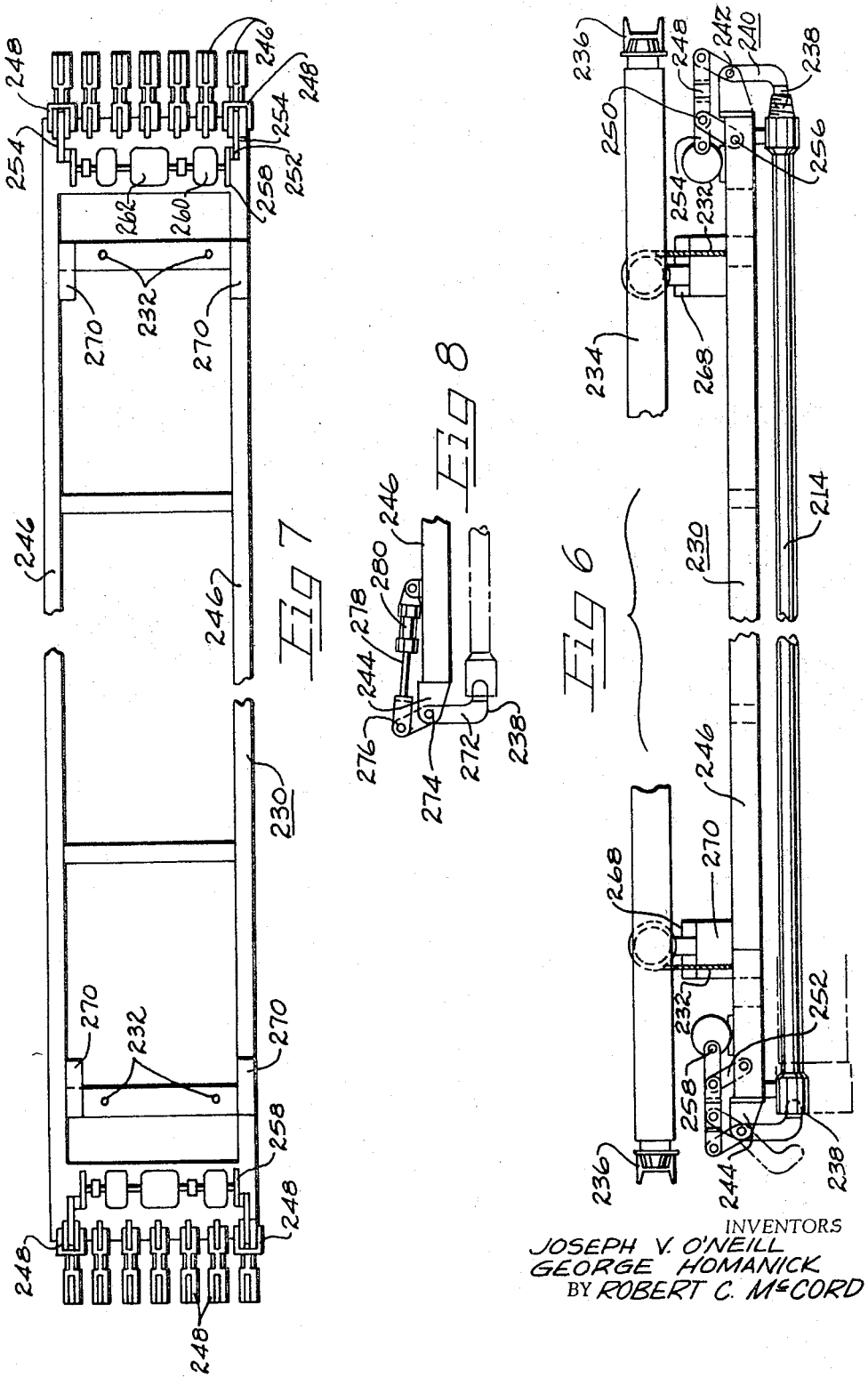

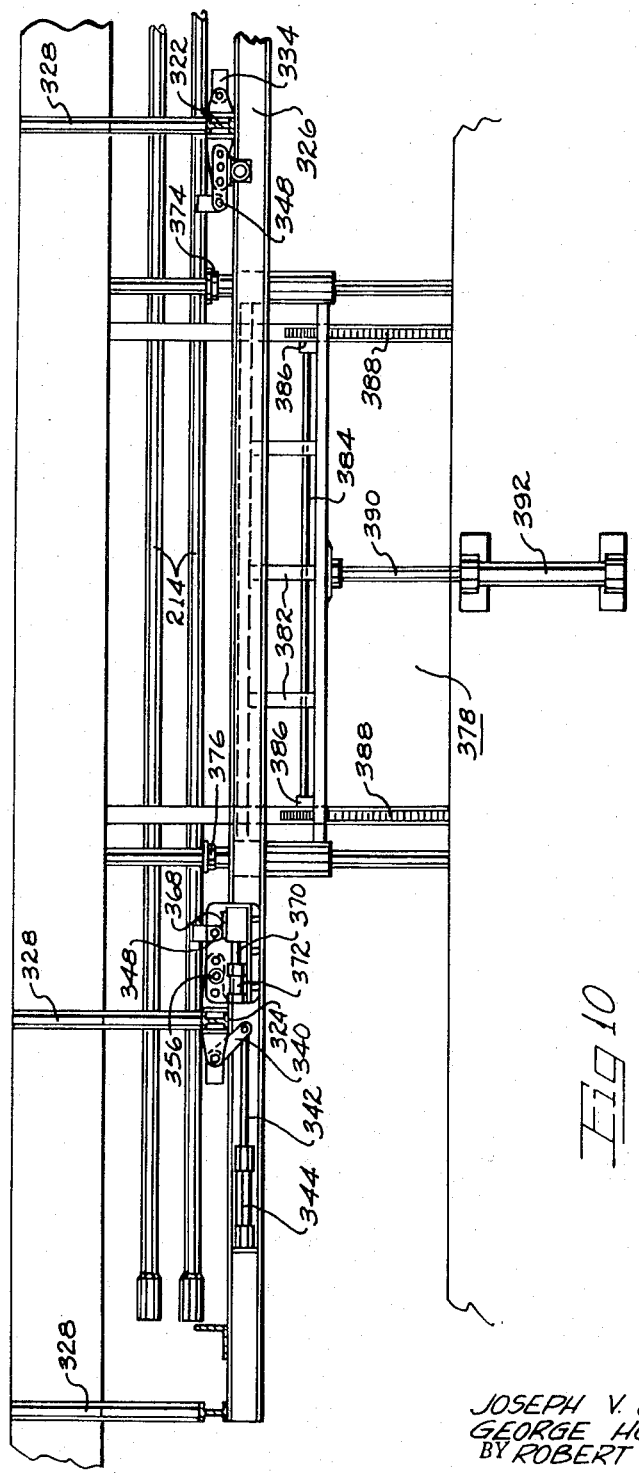

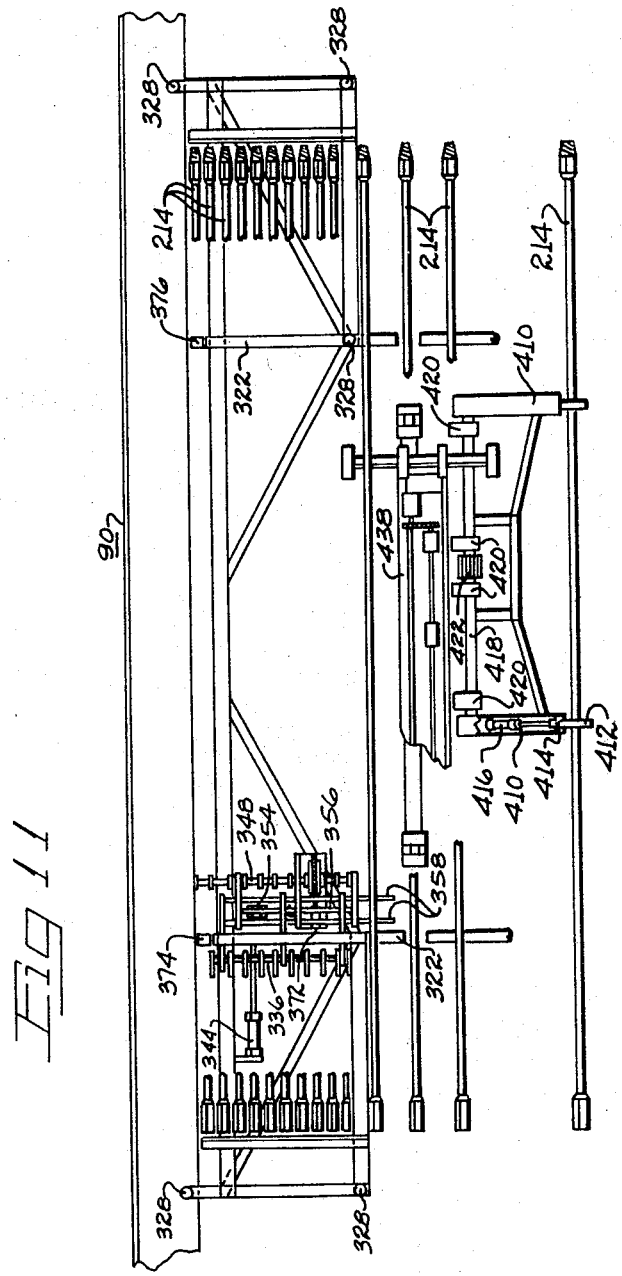

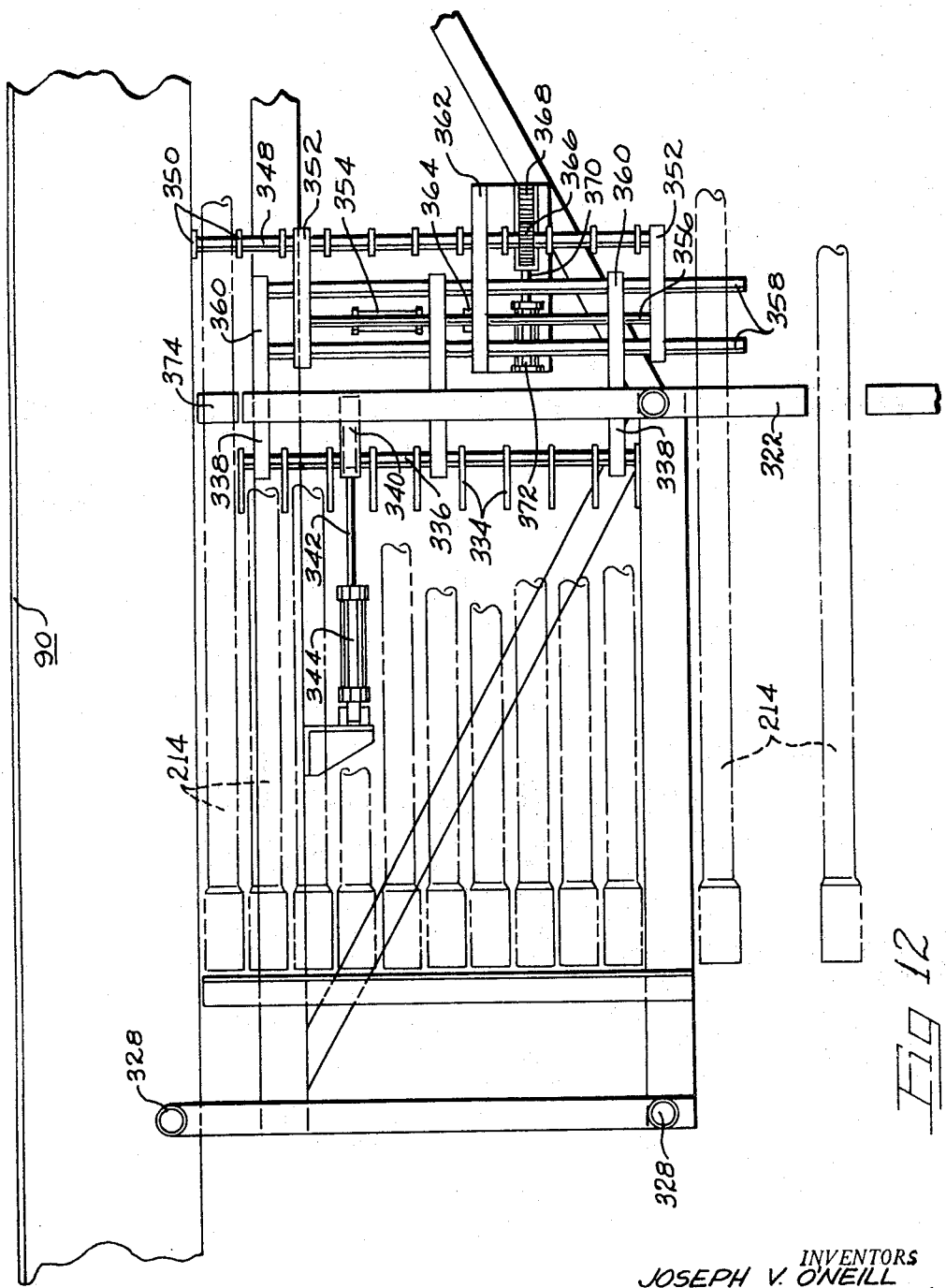

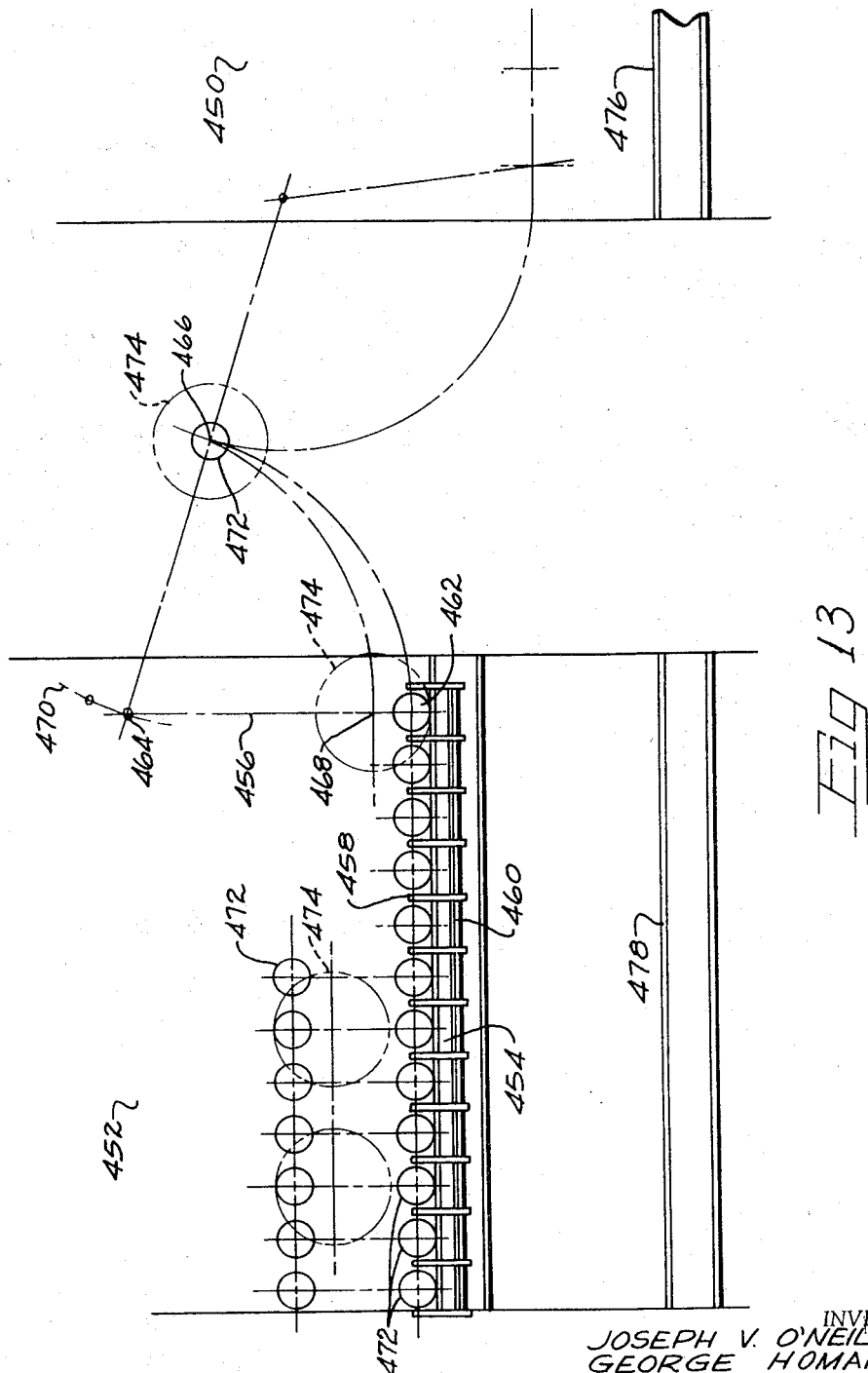

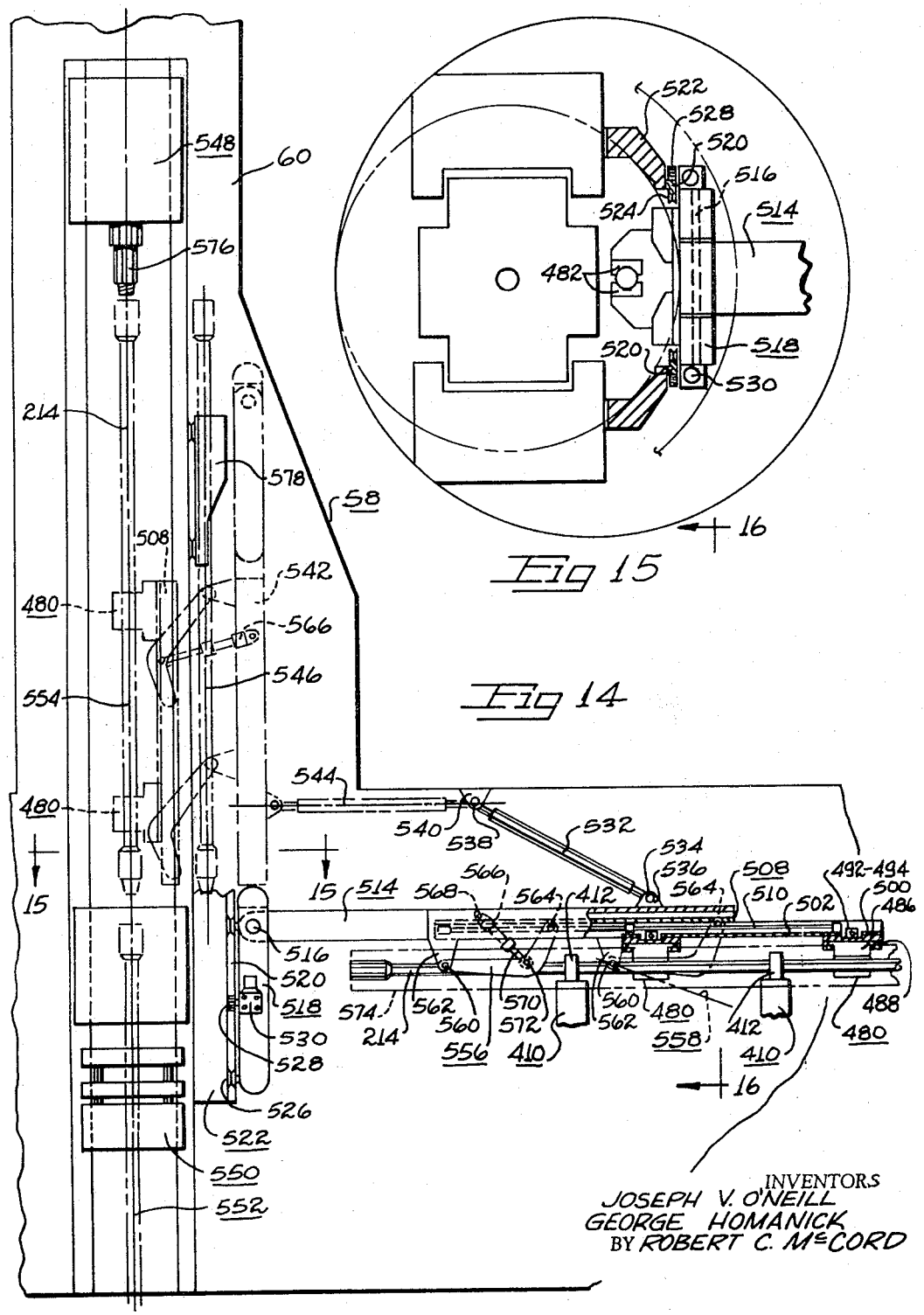

Dec. 27, 1966   J. V. O'NEILL ET AL   3,294,185
AUTOMATED WELL DRILLING APPARATUS
Original Filed Feb. 2, 1959   23 Sheets-Sheet 13
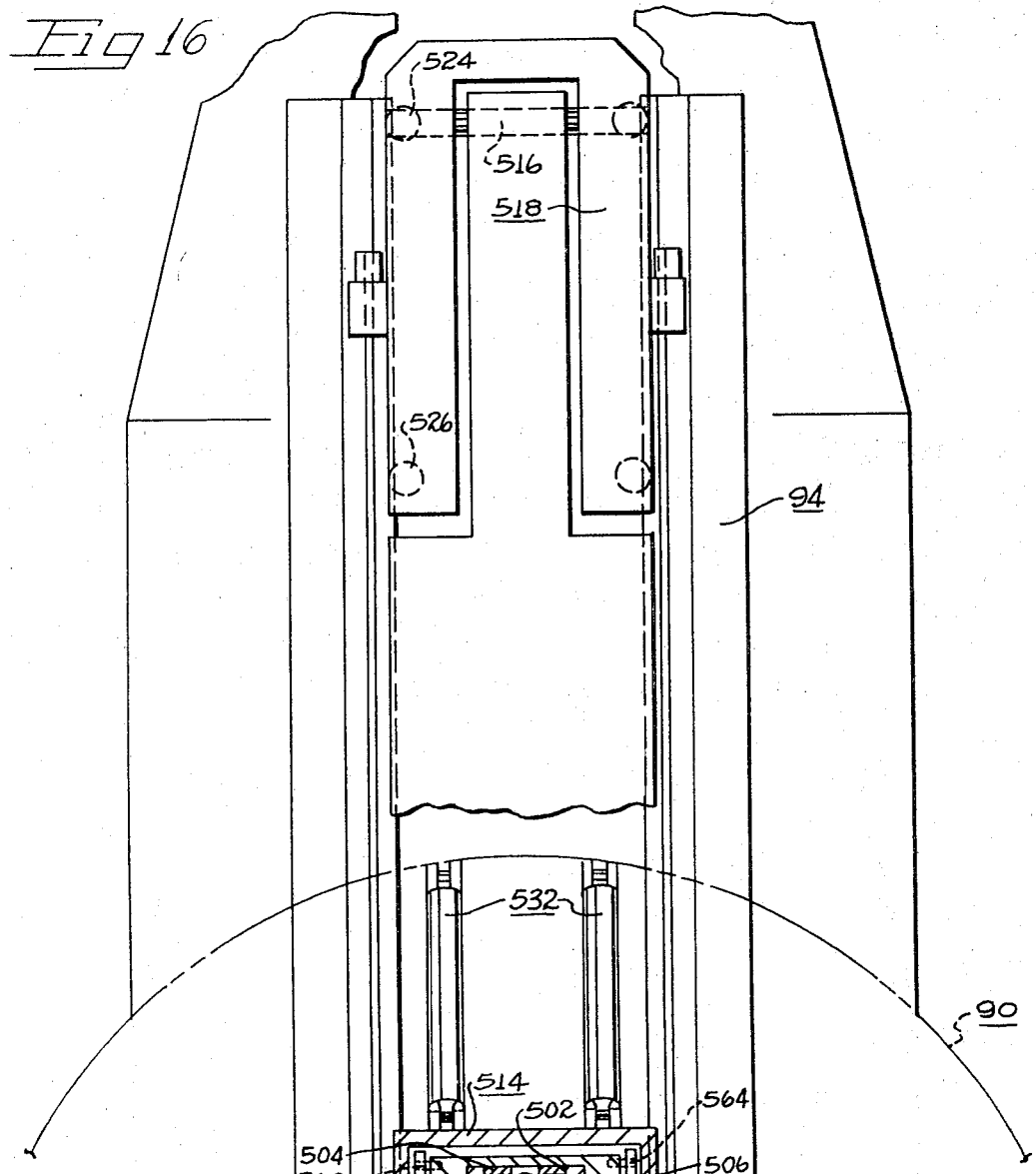
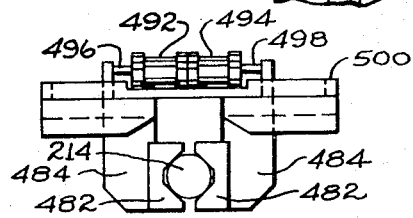
INVENTORS
JOSEPH V. O'NEILL
GEORGE HOMANICK
BY ROBERT C. McCORD

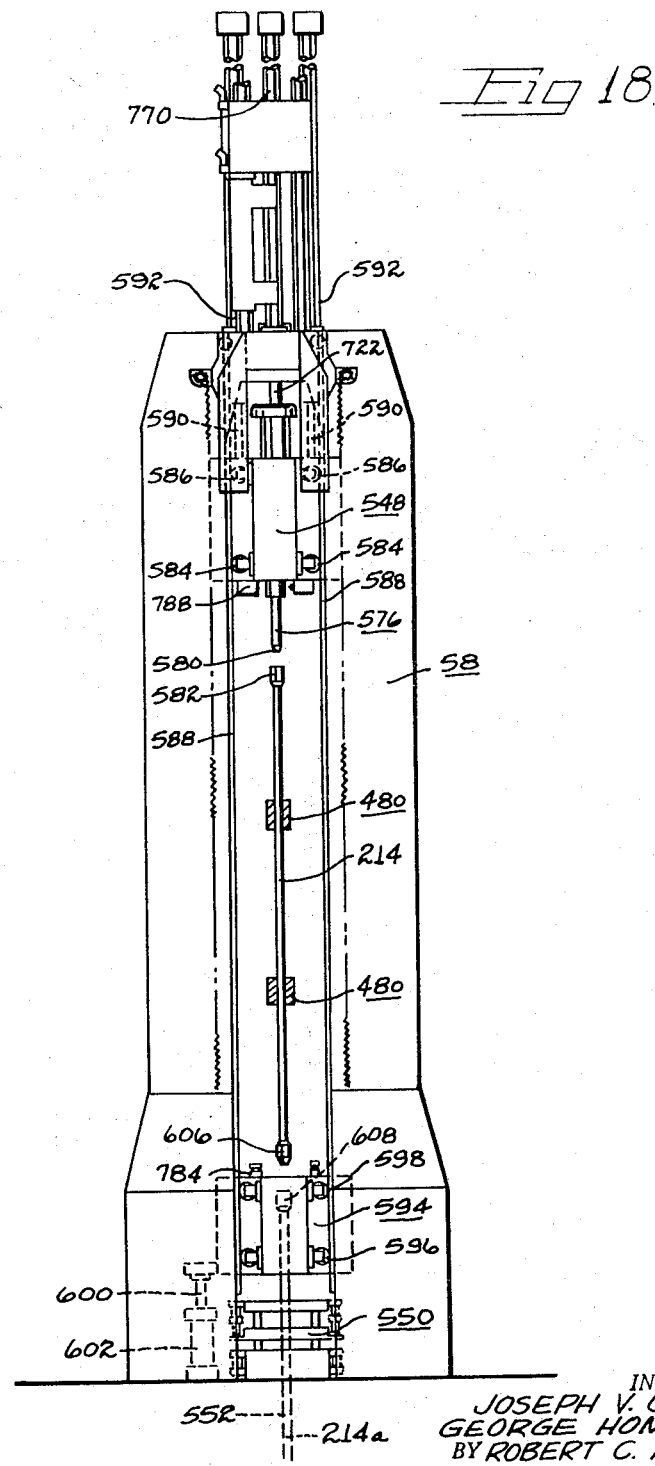

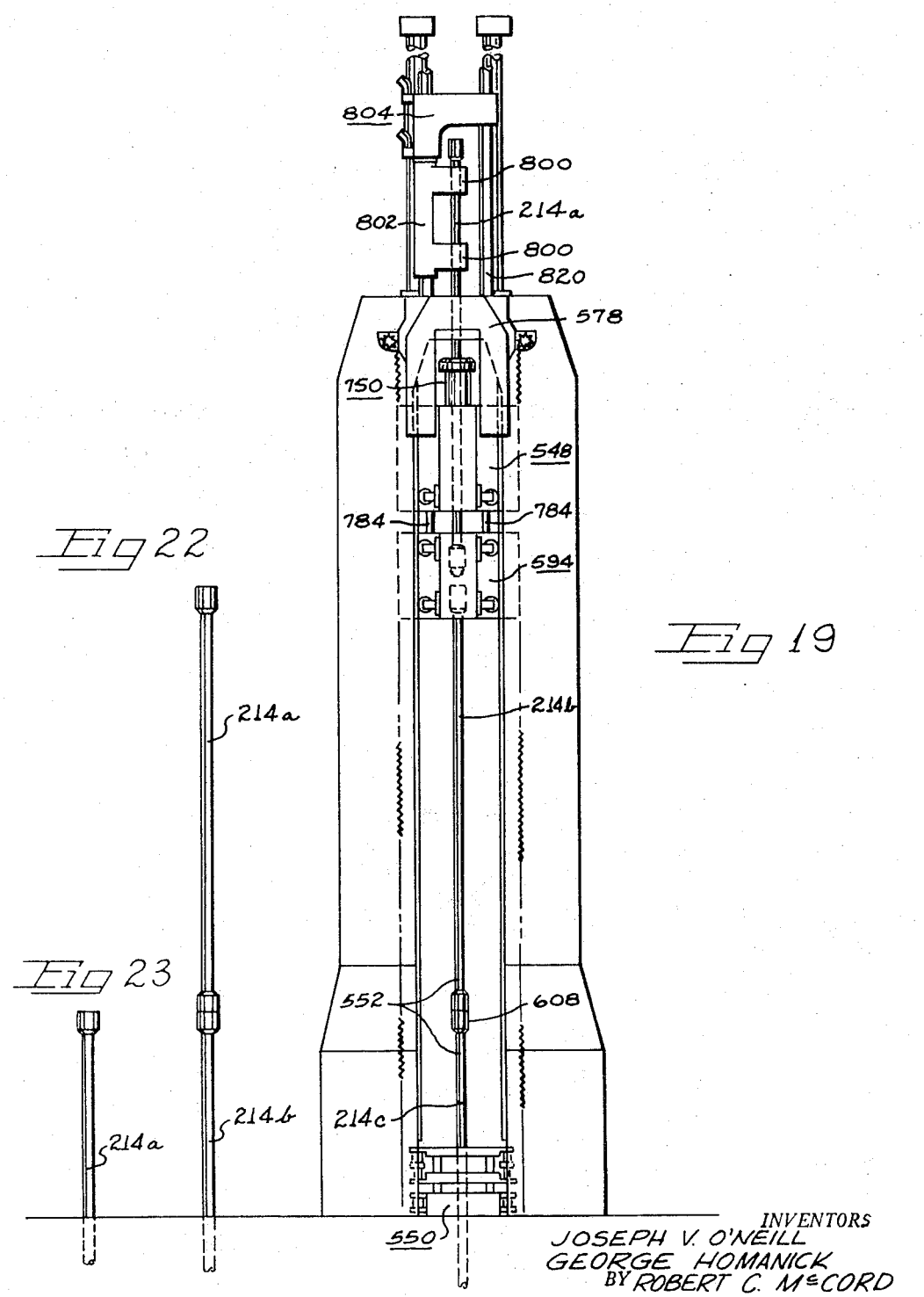

Dec. 27, 1966   J. V. O'NEILL ET AL   3,294,185
AUTOMATED WELL DRILLING APPARATUS
Original Filed Feb. 2, 1959   23 Sheets-Sheet 16
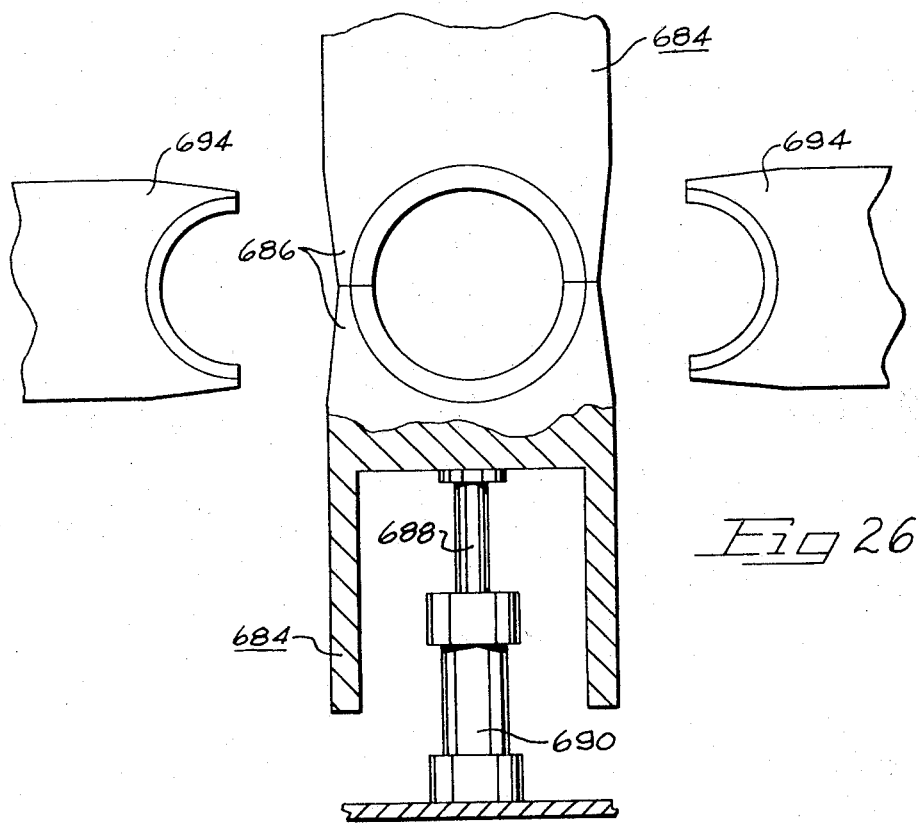
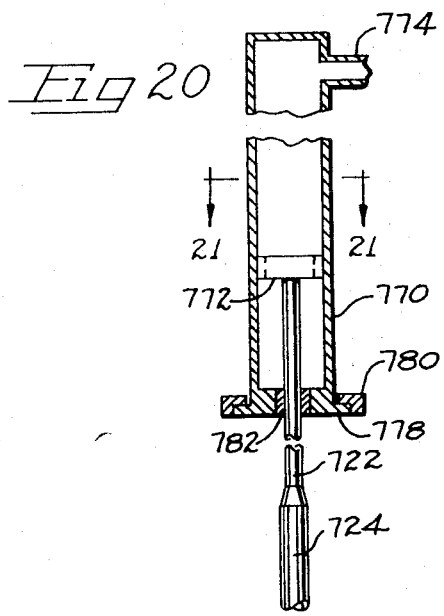
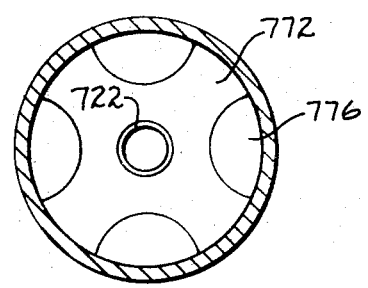
INVENTORS
JOSEPH V. O'NEILL
GEORGE HOMANICK
BY ROBERT C. McCORD

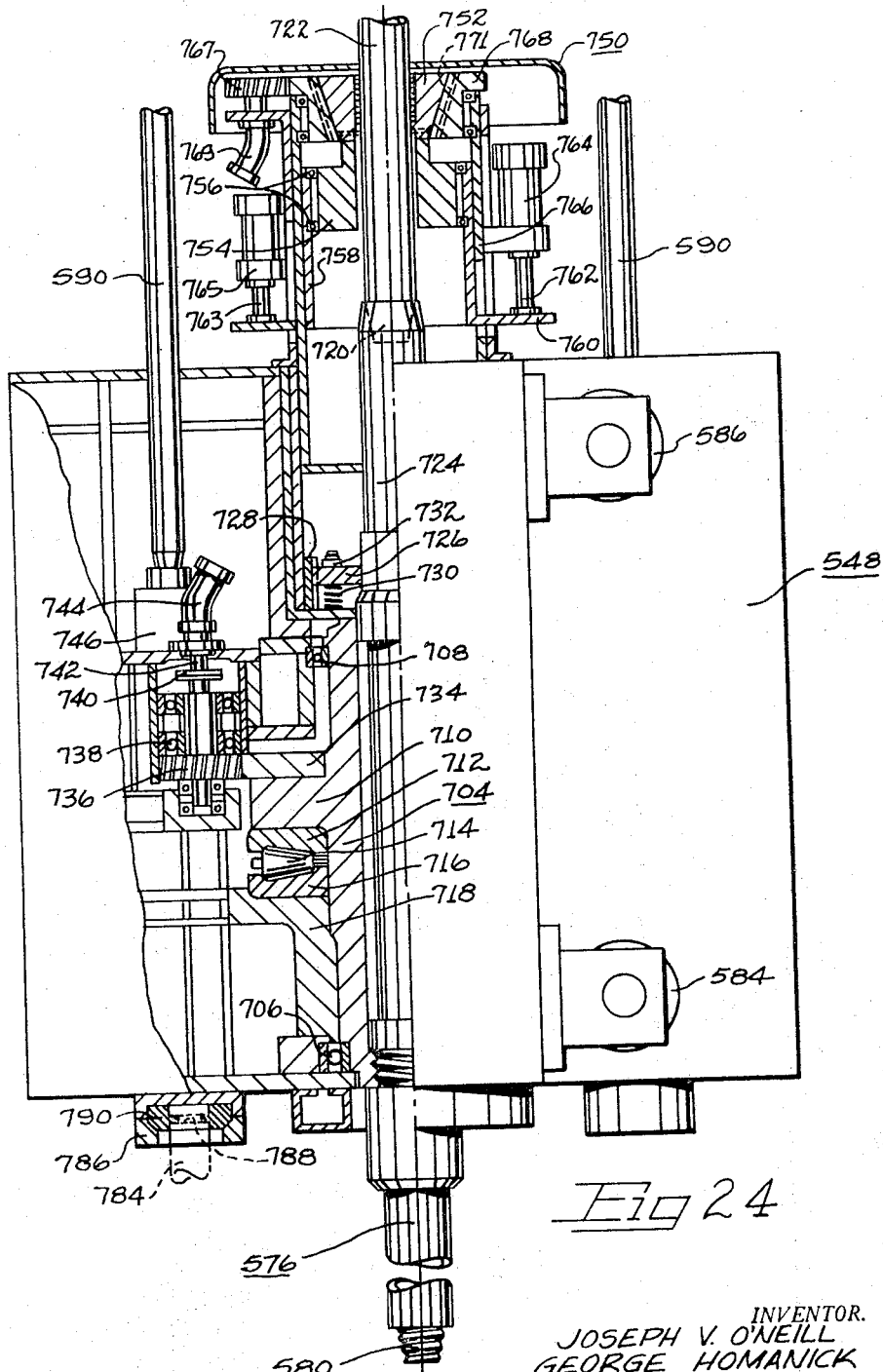

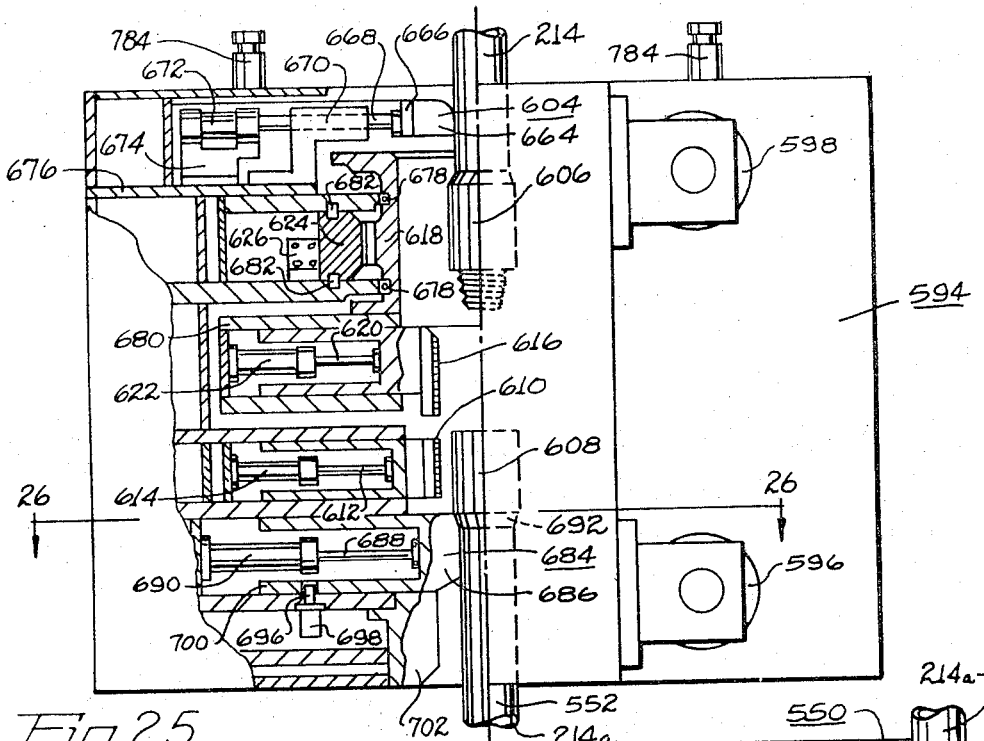
Fig 25
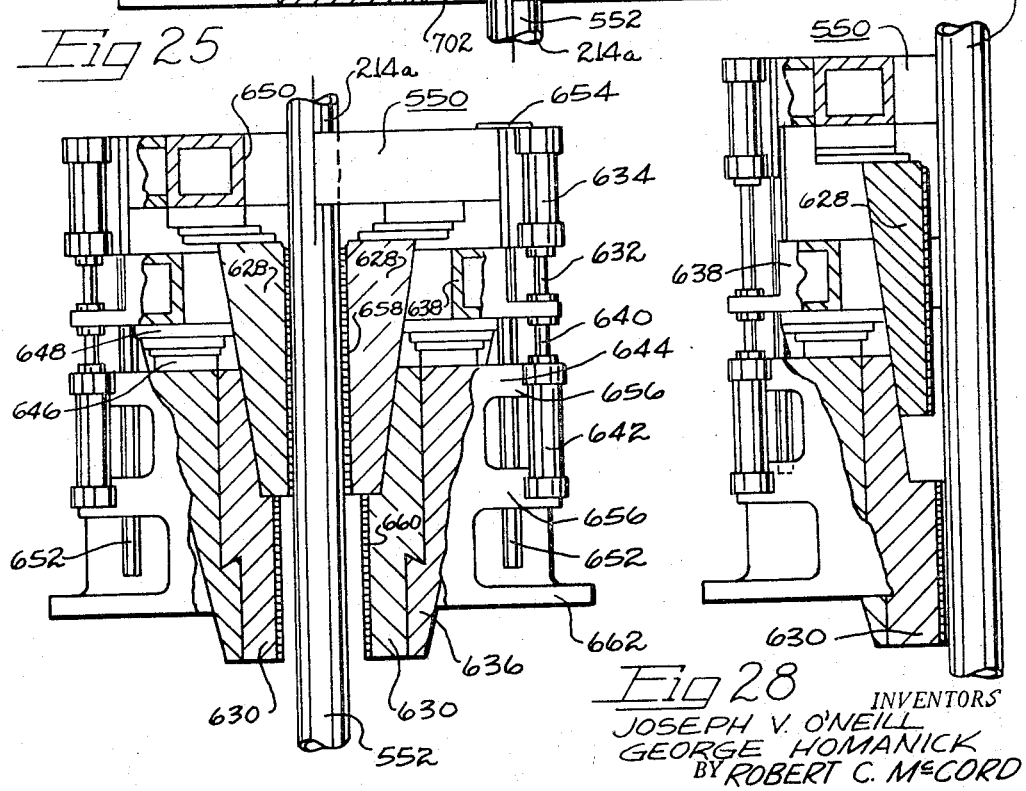
Fig 28
Fig 27
INVENTORS
JOSEPH V. O'NEILL
GEORGE HOMANICK
BY ROBERT C. McCORD

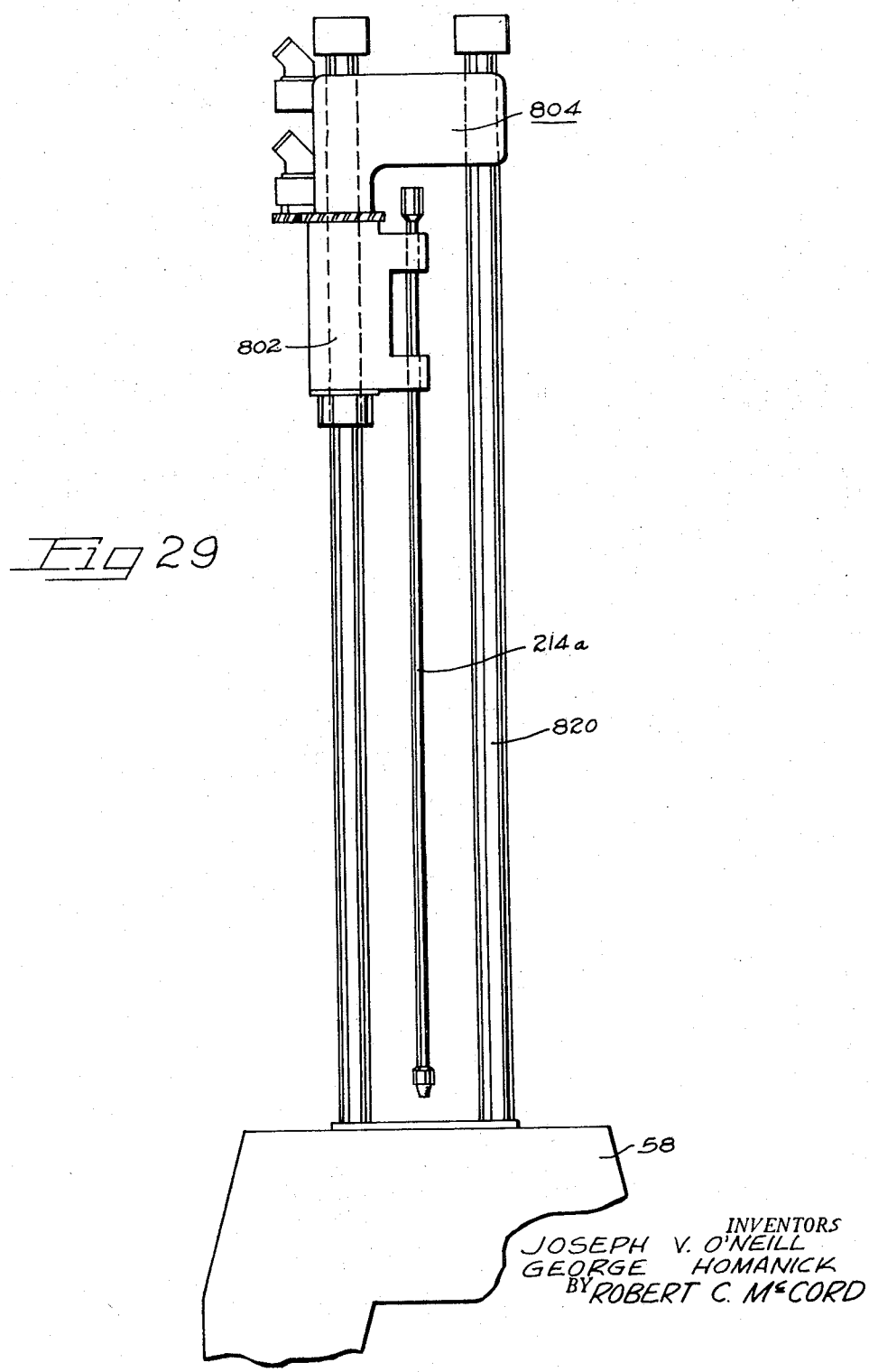

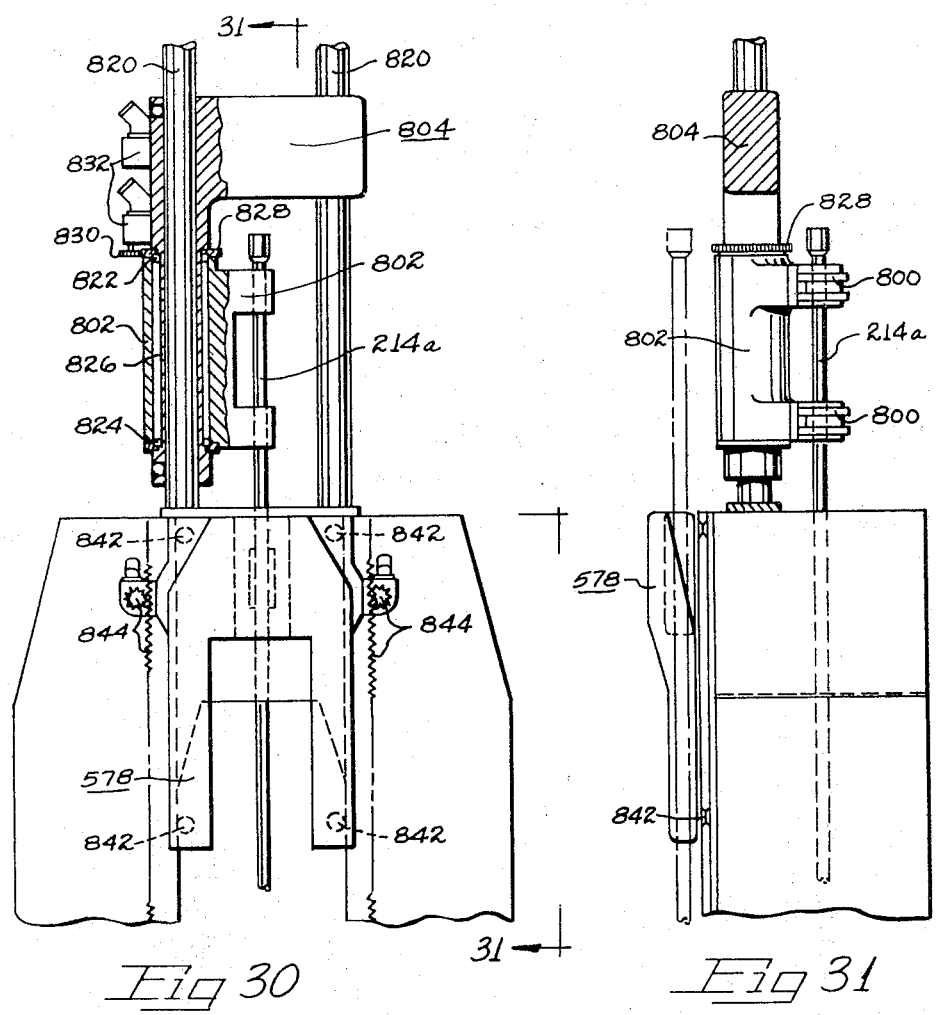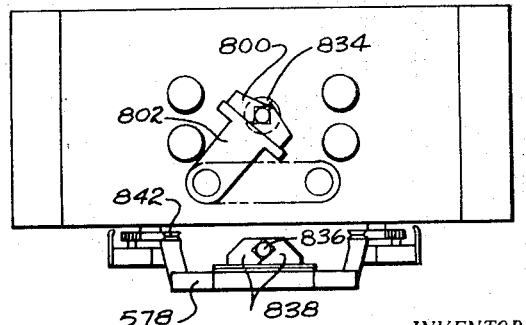

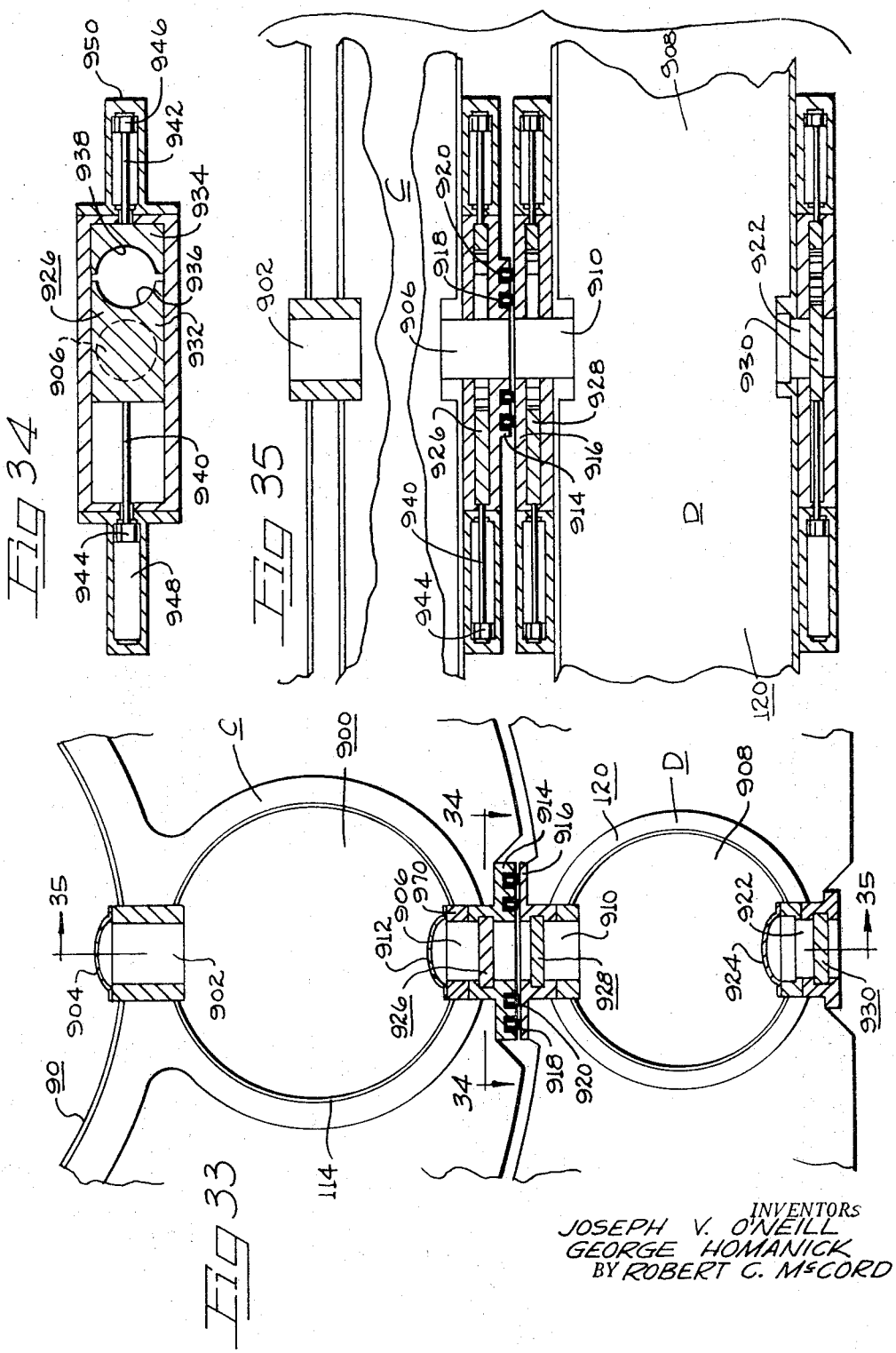

Dec. 27, 1966   J. V. O'NEILL ET AL   3,294,185
AUTOMATED WELL DRILLING APPARATUS
Original Filed Feb. 2, 1959   23 Sheets-Sheet 22

INVENTORS
JOSEPH V. O'NEILL
GEORGE HOMANICK
BY ROBERT C. McCORD

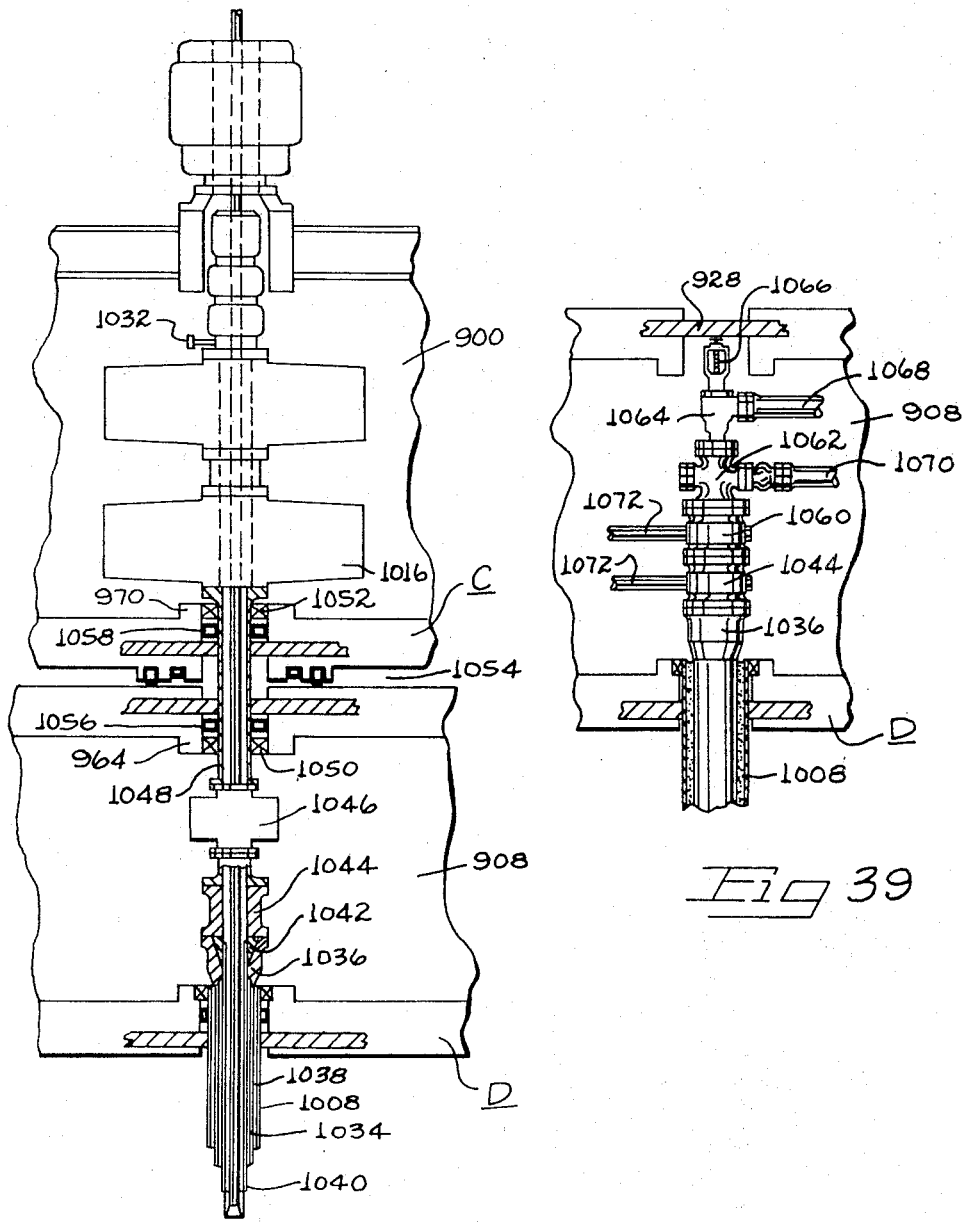

United States Patent Office 3,294,185
Patented Dec. 27, 1966

3,294,185
AUTOMATED WELL DRILLING APPARATUS
Joseph V. O'Neill, Inkster, George Homanick, Livonia, and Robert C. McCord, Inkster, Mich., assignors, by direct and mesne assignments, to Leyman Corporation, Cincinnati, Ohio
Original application Feb. 2, 1959, Ser. No. 790,486, now Patent No. 3,095,048, dated June 25, 1963. Divided and this application Jan. 22, 1963, Ser. No. 271,533
12 Claims. (Cl. 175—85)

This is a division of application Serial No. 790,486, filed February 2, 1959, now Patent No. 3,095,048.

This invention relates to an improved method of drilling offshore oil wells submerged under water, and more particularly to a novel method of utilizing a submarine for drilling oil wells and connecting up an underwater oil well completion system.

In drilling for the rich oil deposits that lie beneath the so-called continental shelves it has heretofore been necessary to utilize floating barges, platforms or to build up islands to support land based drilling rigs of conventional designs. These oil well drilling rigs are cumbersome and they are difficult to operate because a great deal of manual effort is required in connecting up the various lengths of pipe required in the drilling operation. By these conventional drilling methods difficulties are encountered in connecting up the oil will completion systems after a producing well has been developed. Conventional oil well drilling rigs on built-up platforms and barges are hazardous to operate in times of storms at sea.

By our improved system we are able to utilize the combination of a submarine and an oil storage tank lying on the ocean floor in such a manner that successive lengths of pipe and casing when required are fed to a novel pipe handling apparatus in such a manner that virtually no manual labor is utilized in connecting up the various lengths of casing and pipe and in drilling the well. By our novel oil well drilling system we are able to provide a firm foundation for the drilling operation based on the ocean floor, thereby obviating many of the problems encountered in conventional offshore drilling operations wherein the pipe extends through the surface water between the drilling barge or platform and the ocean floor.

Through a unique intercommunicating system between an oil well drilling submarine located on the ocean floor and a surface vessel, we are able to supply the submarine with adequate power and other essentials to enable it to lie on the ocean floor for extended periods of time while an oil well is being drilled.

An object of our invention is therefore to provide a unique method of drilling for oil from the ocean floor by means of a submerged vessel operating in combination with a surface vessel, the submerged vessel having substantially automatically operable pipe and casing handling and drilling equipment, and wherein an underwater completion system may conveniently be connected to a submerged tank positioned on the ocean floor and communicating with the surface when a producing oil well has been developed.

Another object of our invention is to provide a combined submarine and oil well production tank having suitable control and propulsion devices whereby the combined submarine and production tank can descend to the ocean floor and can maneuver to maintain an even keel and to permit moving the submarine and tank combination forward and aft and to steer it athwartship.

A further object of our invention resides in the provision of a substantially automatically operable pipe handling mechanism housed within a submerged vessel which may conveniently lie on the ocean floor to drill an oil well, power and other necessary supplies being furnished from a surface vessel communicating with the submerged vessel.

Yet a further object of our invention is to provide a combined submarine and production tank which may descend to the ocean floor to perform an oil well drilling operation and wherein the submarine may be disconnected from the production tank when a producing well has been developed, the production tank being connected to the oil well by a novel underwater completion system communicating with flow tubes whereby oil may periodically be withdrawn from the production tank at convenient intervals.

Another object of our invention is to provide a submarine having spaced storage compartments for pipe wherein automatically operable pipe handling equipment is provided for successively withdrawing individual lengths of pipe from the storage compartment and moving them angularly for connection into the "drill string."

Another object is to provide an oil well production tank of unique design having a plurality of spaced oil storage and ballast compartments.

Still a further object is to provide an improved production tank having a plurality of spaced separately operable supporting pads employed to level the production tank.

Yet a still further object of our invention is to provide an oil well production tank having a well completion chamber wherein the necessary fittings for interconnecting a producing well with the oil storage compartments may be housed, thereby rendering them readily accessible for repair and maintenance, and which may be easily serviced periodically through travelling messenger buoys movable from the surface to the completion chamber.

Another object of this invention is to provide a sealed-off compartment positioned within a submarine to house blow-out preventer equipment, and wherein check valves communicating with the water are provided to vent any gas that might be escaping from defective preventers.

Still a further object of our invention resides in the provision of readily operable travelling messenger buoys which may communicate between the submarine and a surface vessel to transport personnel and equipment as may be required.

Another object of our invention is to provide sealed-off chambers for accommodating control room and crew's quarters within an oil well drilling submarine.

Still another object of our invention is to provide a fully automatic submerged oil well drilling operation wherein it is unnecessary for any personnel to be present in the submarine during the drilling of the well, the entire operation being controlled and monitored by television cameras connected with a surface vessel.

This application is related to our copending application Serial No. 753,673, filed August 7, 1958, now Patent No. 3,063,507.

Other objects of this invention will appear in the following description and appended claims, reference being had to the accompanying drawings forming a part of this specification wherein like reference characters designate corresponding parts in the several views.

In the drawings:

FIG. 1 is a perspective view, partly in section illustrating one embodiment of our submerged automatic drilling unit housed within a submarine, and having an oil well storage tank associated therewith;

FIG. 2 is a longitudinal sectional view of a modified form of a submarine and oil storage tank assembled therewith;

FIG. 3 is a sectional view taken substantially on the line 3—3 of FIG. 2 looking in the direction of the arrows;

FIG. 4 is a sectional view taken substantially on the lines 4—4 of FIG. 2 looking in the direction of the arrows and showing a pipe storage compartment and pipe checking and cleaning compartment;

FIG. 5 is a plan view of the pipe storage and handling compartments taken substantially on the lines 5—5 of FIG. 2 looking in the direction of the arrows;

FIG. 6 is a side elevational view taken substantially on lines 6—6 of FIG. 5 looking in the direction of the arrows;

FIG. 7 is a plan view of the lifting platform illustrated in FIG. 6;

FIG. 8 is a fragmentary view similar to a portion of FIG. 6 illustrating a modified form of the invention;

FIG. 10 is a view taken substantially on the lines 10—10 of FIG. 9 looking in the direction of the arrows;

FIG. 11 is a plan view taken substantially on the lines 11—11 of FIG. 9 looking in the direction of the arrows;

FIG. 12 is an enlarged plan view of a portion of the mechanism illustrated in FIG. 11;

FIG. 13 is an elevational view illustrating the pipe handling equipment for shifting the pipe from the horizontal to the vertical position;

FIG. 14 is a side elevational view, partly in section illustrating the pipe transfer arm and central derrick section;

FIG. 15 is a sectional view taken substantially on the lines 15—15 of FIG. 14 looking in the direction of the arrows;

FIG. 16 is a sectional view taken substantially on the lines 16—16 of FIG. 14 looking in the direction of the arrows;

FIG. 17 is a fragmentary view illustrating a modified form of pipe gripping jaws;

FIG. 18 is an elevational view, partly in section, illustrating the derrick which supports the well drilling equipment;

FIG. 19 is a view similar to FIG. 18 illustrating the removal of the pipe during the so-called "trip" cycle;

FIG. 20 is a fragmentary sectional view illustrating the mud cylinder;

FIG. 21 is a sectional view taken substantially on the line 21—21 of FIG. 20 looking in the direction of the arrows;

FIG. 22 is a fragmentary view illustrating a portion of the drill string;

FIG. 23 is a view similar to FIG. 22 illustrating a further step in withdrawing the pipe from the ground;

FIGS. 24 and 25 are elevational views, partly in section illustrating the drill head and the knocker chuck, and the safety check respectively;

FIG. 26 is an exploded view of the bowl chuck;

FIG. 27 is an elevational view, partly in section of the safety chuck;

FIG. 28 is a fragmentary view of a portion of FIG. 27 illustrating the safety chuck in a pipe released position;

FIG. 29 is an elevational view illustrating the upper transfer carriage in its uppermost position;

FIG. 30 is a fragmentary elevational view, partly in section, illustrating the upper transfer carriage in its lowermost position;

FIG. 31 is an elevational view, partly in section, taken substantially on the line 31—31 of FIG. 30 looking in the direction of the arrows;

FIG. 32 is a plan view of the mechanism illustrated in FIGS. 30 and 31;

FIG. 33 is a fragmentary sectional view taken substantially on the line 33—33 of FIG. 2 looking in the direction of the arrows;

FIG. 34 is a sectional view taken substantially on the line 34—34 of FIG. 33 looking in the direction of the arrows;

FIG. 35 is a fragmentary, longitudinal elevational view taken substantially on the line 35—35 of FIG. 33 looking in the direction of the arrows;

FIGS. 36 through 38 are views similar to FIG. 35, certain structural components used in the initial drilling operation being positioned in place showing various structural components used in successive stages of the drilling operation;

FIG. 39 is a fragmentary sectional view of the production tank and showing the wellhead completion system used in connecting up the oil well to the production tank after a producing well had been developed.

Figure 9:
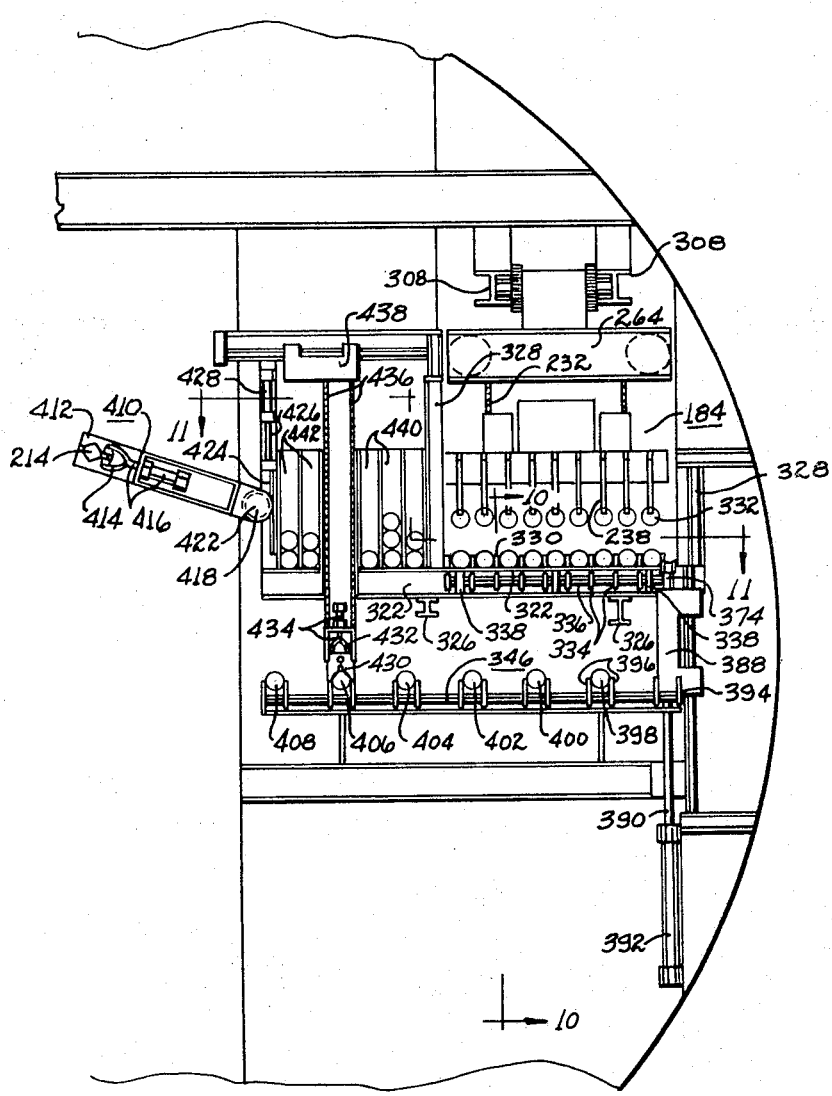
FIG. 9 is a sectional view taken substantially on the lines 9—9 of FIG. 2 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIG. 1 it will be noted that a submarine A is operatively connected to an oil well storage or production tank B. The production tank B is an elongated member having a plurality of longitudinally extending pressure chambers 20 adapted to receive oil pumped from the oil well. The pressure chambers 20 are housed within a suitably compartmentalized chamber 22 into which water may be pumped and expelled to facilitate submerging and elevating the submarine and the production tank assembly to and from the ocean floor.

The production tank B has a plurality of spaced levelling pads 24 mounted on vertically movable pistons 26 slidably mounted in cylinders 28 and adapted to be controlled by suitable power means, such for example as hydraulic fluid under pressure to level the production tank B and the submarine A. The production tank B is provided with suitable cradles 30 adapted to receive and support the bottom of the submarine A.

The submarine A has an outer shell 32 and an inner pressure shell 34 between which are a series of compartments 36 for the reception of water used to control the descent and elevating of the submarine and tank from the surface to the floor of the ocean. It wil be noted that suitable reinforcing bulkhead and spacer members 38 are employed to interconnect and maintain the outer and inner shells 32 and 34 in spaced apart relation and to provide a rigid construction.

The submarine is provided with suitable engines or prime movers 40 in compartments 42 to drive a propeller 44 forward or backward to move the submarine and production tank longitudinally in opposite directions. The submarine A has longitudinally spaced athwartship operable propellers 46 and 48 by means of which the ship may be steered. Interposed between the outer shell 32 and the inner pressure shell 34, preferably at the top of the submarine is a crew's compartment 50 and a control room 52.

The submarine A may be interconnected with a surface vessel and with the space above the surface of the water by means of air tubes 54 through which air and other necessary materials and supplies required in the drilling operation may be delivered from the surface vessel to the submarine as more fully disclosed in the copending application referred to above.

Suitable power control and anchor cables 56 are also provided to interconnect the submarine A with the surface vessel to permit power, preferably of the electric type to be delivered to the submarine A for the operation of the drilling equipment. It will also be apparent that if desired air passage tubes may extend from the submarine above the level of the water thereby providing air for operation of engines positioned in the submarine. It is thus unnecessary to have the power control cables referred to herein.

The drilling equipment housed within the submarine A consists of a derrick mechanism 58 preferably centrally disposed within the submarine A, and extending vertically therein. A dome 60 houses the derrick 58 and other necessary equipment in water-tight relation.

A plurality of compartments 62, 64, 66 and 68 are provided for the storage of pipe, two of the compartments being positioned forwardly in the submarine, and the other two being positioned sternward. It will be noted that the positioning of the pipe storage compartments is substantially balanced longitudinally of the submarine whereby a level keel may be maintained during descent to the ocean floor.

Successive lengths of pipe may be withdrawn from the compartments 62 to 68 by an overhead travelling crane system 70. Attention is directed to the fact that successive layers of pipe are taken alternately from the forward compartments and then from the sternward compartments so as to maintain a desired balance within the submarine.

It will be noted that the overhead travelling crane system 70 deposits layers of pipe from the respective pipe storage compartments in a pipe handling compartment 72 positioned adjacent the derrick structure 58. In the compartment 72 the pipe is checked for straightness and has its threads cleaned and lubricated to insure ease of connection in the pipe handling system, pipe which does not comply with the desired specifications being automatically rejected. We prefer that this entire pipe handling and checking operation be performed automatically thereby eliminating the necessity of any personnel being present in any portions of the submarine other than the crew's quarters 50 and the control room 52.

A transfer arm 74 grasps successive individual lengths of pipe in the pipe handling compartment 72 and moves them angularly from a horizontal position to a vertical position illustrated at 76 in an operative relation in front of the derrick structure 58.

Referring now to FIG. 2 it will be noted that a modified form of submarine C is provided with a production tank D. It will be noted that this form of the submarine C consists of an elongated cylindrical section 90 extending virtually the entire length of the submarine. It will be noted that a vertically extending cylindrical section 92 intersects with and is integrally secured to the inner horizontally extending cylindrical section 90. The cylindrical section 92 houses the derrick structure 58, described in connection with the embodiment of the submarine A shown in FIG. 1, and as shown in greater detail in FIG. 18 hereinafter to be described. Two additional horizontally extending cylindrical sections 96 and 98 are superimposed on the inner horizontally extending cylindrical section 90 and are positioned forwardly and rearwardly from the vertically extending cylindrical section 92. The forwardly disposed cylindrical section 96 is fitted to serve as a control room for the monitoring of the automatic operation of controlling the ascent and descent of the submarine C. The cylindrical section 98 is positioned rearwardly from the vertical section 92 and is fitted to provide quarters for the crew and galley, etc.

Referring now in more detail to FIG. 3 it will be noted that an outer horizontally extending cylindrical hull 100 surrounds the inner cylindrical section 90. A plurality of longitudinally extending pairs of compensating tanks 102, 104 and 106 to permit taking on water to maintain a desired degree of trim of the submarine as expendables in the form of casing, pipe, mud and other necessary equipment and supplies are removed from the submarine in the drilling operation hereinafter more fully described. The pairs of tanks 102, 104 and 106 extend the full length of the submarine C and are divided longitudinally into compartments or sections so that as weight is removed from one longitudinally spaced area of the submarine water can be taken aboard in a closely adjacent area to maintain a desired degree of buoyancy or stability of the submarine. The automatic controls as hereinafter described are provided to maintain a desired degree of stability of this phase of the controls. A plurality of mud storage tanks 108, 110 and 112 are interposed between the inner cylindrical wall 90 and the outer cylindrical hull 100 in spaced relation relative to the compensating tanks 102, 104 and 106. Also interposed between the inner cylindrical wall 90 and the outer hull 100 is a blow-out preventer compartment 114 positioned beneath the central derrick section 58. The blow-out preventer compartment 114 is interposed longitudinally of the submarine between the substantially centrally disposed mud storage tanks 108 as shown in FIG. 2. The space 116 between the inner cylinder 90 and the outer hull 100 between the compensating and mud storage tanks and the blow-out preventer compartment may be flooded with seat water to assist in varying the buoyancy of the submarine to assist in providing controlled descent and ascent.

The production tank D is secured to the submarine C by a plurality of longitudinally spaced retractable locks 118. The production tank D is provided with a substantially centrally disposed wellhead compartment 120 positioned beneath the blow-out preventer compartment 114 and adapted to communicate therewith through suitable movable hatches 122 and 124 positioned respectively in the blow-out preventer compartment 114 and in the wellhead compartment 120. The lower surface 126 of the wellhead compartment 120 is provided with a hatch 128 aligned with the hatches 122 and 124 and movable to a retracted position to permit a drill string to pass downwardly from the derrick 58 in the vertically extending section 92 of the submarine C through the blow-out preventer compartment 114 and the wellhead compartment 120. The production tank D is also provided with a plurality of laterally and longitudinally spaced compartments 132, 134 and 136 adapted for the reception of crude oil received from the well. The production tank D is of generally arcuate shape corresponding substantially with the outer contour of the hull 100 so as to readily support the submarine C thereon, the two units being secured together by the retractable locks 118.

The blow-out preventer compartment 114 communicates through hatches 138 and 140 with the space within the main submarine in alignment with the derrick section 58, thereby providing an opening 142 through which the drill string may pass from the submarine C through the blow-out preventer compartment 114 and wellhead compartment 120 for projection into the earth at the floor of the ocean.

Figures 36, 37:
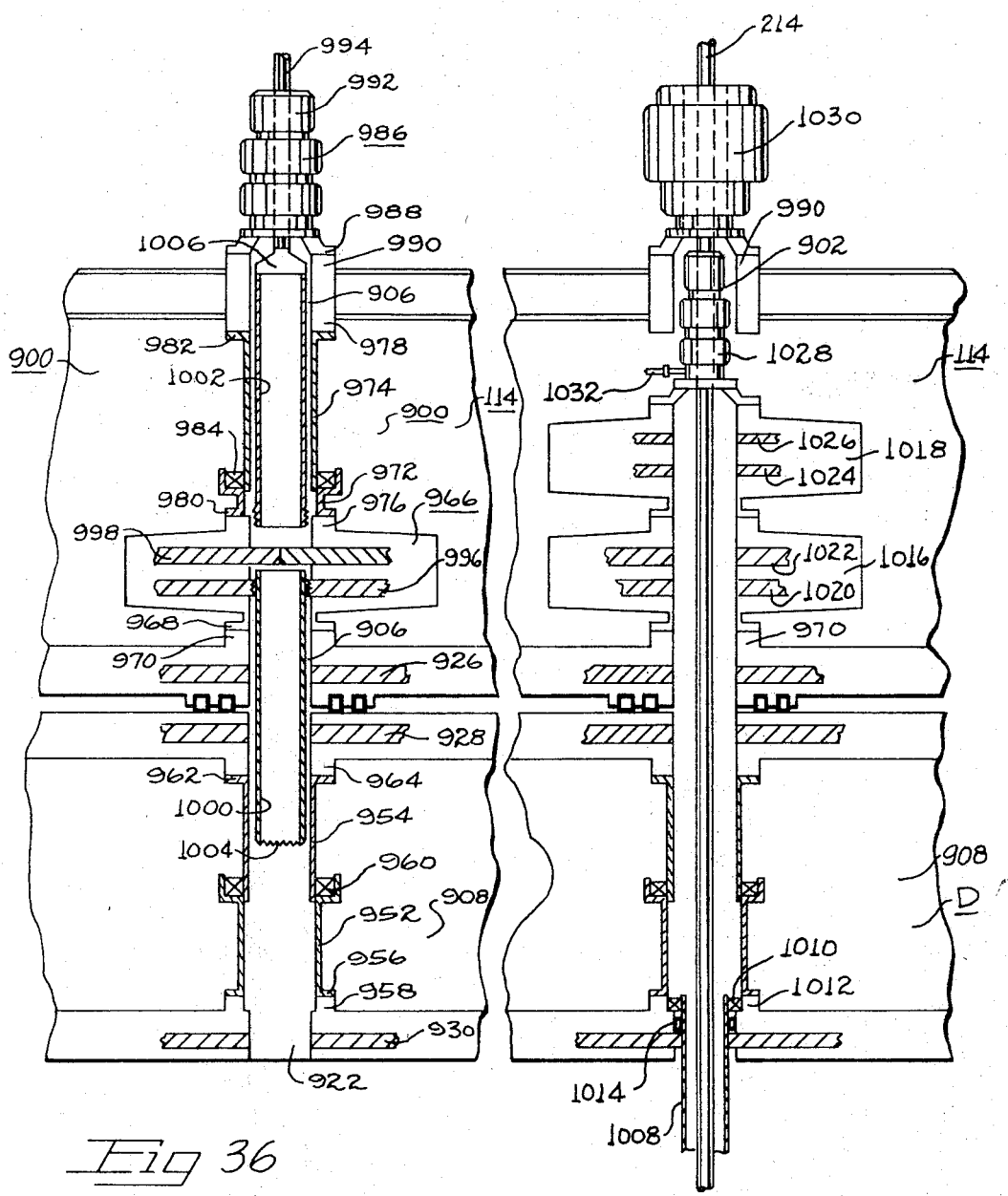

The blow-out preventer compartment 114 is provided in its walls 144 with a plurality of pressure responsive check valves 146 to permit high pressure gases that may be leaking into the blow-out preventer compartment 114 from the well to escape through the walls 144 to the sea thereby preventing the submarine from being subjected to high pressure. It will be understood, of course, that blow-out preventers as more clearly described in connection with FIGS. 36 and 37 are employed to control the down hole gas pressures from entering the submarine, however, if a leak should develop in the preventers and the gas should escape, that gas would be confined to the blow-out preventer compartment 114. Should this pressure build up in this chamber it may be relieved by the check valves 146 in the walls 144. It will be noted that another blow-out preventer 148 positioned within the submarine adjacent the hatch 140 is provided to engage the drill string to prevent the admission of gases to the submarine. Attention is directed to the fact that the blow-out preventer 148 may close off and engage a pipe, casing or any other drill string element which may be within the preventer 148 at the time of the blow-out.

Suitable hatches 150 and 152 are provided to interconnect the space within the submarine C with the space within the blow-out preventer compartment 114 and the wellhead compartment 120 to permit workmen to enter the compartments 114 and 120 as occasion demands to adjust or connect up equipment therein. It will, of course, be understood that after a producing well has been developed and the submarinne C has released itself from the production tank D and has therefore departed, leaving the production tank C on the ocean floor, the workmen may enter the wellhead compartment 120 through the hatch 152 communicating with suitable messenger buoys as described in connection with our Patent No. 3,063,507. It will be noted that an enlarged hatch 154 is provided between the cylindrical section 90 of the submarine and the blow-out preventer compartment 114 to permit introducing blow-out preventer compartment and other large items of equipment in the compartment 114 into the submarine.

It will be noted that the cylindrical section 96 superimposed on the main cylindrical section 90 is provided with a double wall hatch 156 communicating with the space within the main cylindrical section 90 of the submarine and the space within the cylindrical section 96 which provides the control room for directing the drilling operations. The control room 96 is thus isolated from the space within the submarine C. An escape chamber 158 positioned preferably adjacent the top of the cylindrical section 96 is provided with double hatch members 160 and 162 through which suitable messenger buoys may communicate between the space within the control chamber 96 and the surface of the water as fully described in our copending application referred to above.

Similar hatch and escape chambers 164 and 166 and hatch members 168 and 170 are provided in the cylindrical section 98 defining the crew's quarters to permit the travel of workmen between the submarine and the crew's quarters and between the crew's quarters and the space above the surface of the water. Similar escape chambers 172 and 174 are provided at the fore and aft sections of the submarine as illustrated to provide auxiliary avenues of escape in the event of an emergency where personnel may be in sections other than the control rooms or crew's quarters during the time when a blow-out might occur.

Referring to the extreme end of the submarine illustrated in FIG. 2 it will be noted that a sealed chamber 176 adapted to receive the air tubes 178 extending to the surface of the water to provide for the flow of air and other necessary materials to the submarine and to vent gases therefrom.

It will be noted that the space within the main cylindrical section 90 of the submarine is defined longitudinally into front and rear compartments 180 and 182 which provide casing and pipe storage compartments, and compartments 184 and 186 positioned fore and aft respectively of the derrick section 94. These compartments 184 and 186 are in turn divided into a plurality of vertically spaced tiers. It will be noted that the compartment 186 for example, is provided with a plurality of spaced floors adapted to provide storage space for necessary components and material such, for example, as cement, quantities of mud, mud additives and accessory equipment including machinery for example, compressors, pumps, diesel power units, etc.

It will also be noted that the compartment 184 is provided with a floor 188 providing a space for additional storage of hydraulic pumping equipment or other accessories or devices required in the performance of the oil well drilling operation.

The space in the compartment 184 above the floor 188 is provided with automatic pipe and casing handling equipment 190.

Referring now to FIGS. 2 and 5 it will be noted that the pipe storage compartments 180 and 182 are illustrated in FIG. 5, it being noted that the pipe storage compartment 182 is similar to the compartment 180 and is disposed at the extremities of the submarine remote from the derrick section 94. Referring now to FIGS. 4 and 5 it will be noted that the compartment 180 has five laterally spaced vertically disposed compartments 200, 202, 204, 206 and 208. These compartments are divided by vertically extending divider walls extending longitudinally from bulkhead 210 to bulkhead 212 for storing drill pipe of uniform diameter and lengths being stored in a single compartment. The pipe or casing 214 has a central section of uniform diameter and enlarged end sections and spaced box and pin joints 216 and 218 respectively. Separating T rails 220 secured to the bulkhead 210 are provided to maintain spaced relation between the box ends 216 of the pipe or casing 214, similar T rails 222 carried by the bulkhead 212 being provided to maintain the pin joint ends 218 in spaced relation. As shown in FIG. 4 it will be noted that horizontal rows of pipe are stored one on top of another in vertically spaced rows 224. It will be noted that the pipe storage compartments 200 to 208 may each receive a pipe of different diameters as shown in FIG. 4 wherein three different diameters are illustrated.

Referring now to FIG. 6 it will be noted that the lifting platform 230 carried by suitable cables 232 suspended by a travelling crane trolley 234 having suitable roller wheels mounted on tracks 236 carried by the bulkheads 210 and 212 in such a manner that the crane trolley 234 may move transversely within the compartments 180 and 182 to pick up and transfer laterally pipe from any of the five compartments. Referring to FIG. 6 it will be further noted that the lifting platform 230 is provided with a plurality of downwardly extending fingers 238 adapted to project into the box and pin ends 216 and 218 of the pipe or casing 214. The fingers 238 are provided with replaceable tips to project into the threaded ends in such a manner as to avoid damaging the threads.

Referring to FIGS. 6 and 7 it will be noted that a finger 238 is provided for engaging each of the lengths of pipe 214 that are positioned in a horizontal row in one of the five spaced compartments 200 to 208 in the pipe and casing and storage compartments 180 and 182 of the submarine. Each of the fingers 238 is carried by a bell crank 240 each of which is pivoted at 242 in a bracket 244 secured to the frame members 246 of the lifting platform 230. The free end of the bell crank 240 extending beyond the pivot 242 is pivoted to a connecting link 248 which in turn is pivoted at 250 to a pair of links 252 and 254, the link 252 being pivotally mounted to the frame 230. It will be noted as shown in FIG. 6 there are only two links 254, mounted on opposite sides of the lifting platform 230. It will be noted that the links 252 are mounted on a key shaft 256 extending through and keyed in corresponding links 252 for actuating each of the fingers 238 adapted to engage each piece of pipe 214. Laterally spaced links 254 are pivotally connected to an oscillating disk 258 driven through a speed reducer and brake mechanism 260 driven by an electric motor 262 carried by the lifting platform 230. At the operation of this mechanism to pick up a layer of pipes the lifting platform 230 is moved to a position above the desired compartment 200 to 208 by movement of the travelling crane 234. The control mechanism is then actuated to lower the lifting platform 230 carried by the cables 232 into operative relation with the desired row of pipe in the selected compartment with the fingers 238 in spaced relation relative to the box and pin ends of the pipe 214 in the space between the T rails 220. The electric motors 262 are then actuated to move the fingers 238, the electric motors 262 through the reducer and brake mechanism 260 oscillate the link 254 to a clamped position as shown in FIG. 6 wherein the linkage pivots the bell cranks 240 to project the fingers 238 into the ends of the pipe 214 to engage the pipes 214. The lifting platform is then elevated by actuation of the cables 232 and the travelling crane 234 is moved laterally on the rails 236 into the longitudinally movable trolley 264.

It will be noted that the travelling crane trolley 234 has a transversely extending support structure 268 having a horizontal lower surface. The lifting platform 230 is provided with longitudinally and transversely spaced snubbing blocks 270 adapted to engage the support structure 268 when the lifting platform 230 is elevated into contacting relation relative to the travelling crane trolley 234. The frictional contact thus exerted between the travelling crane and the lifting platform prevents lateral and longitudinal swaying of the pipe carrying platform 230 relative to the travelling crane trolley 234.

Referring now to FIG. 8 it will be noted that each of the fingers of the pipe engaging fingers 238 may be individually actuated to permit the picking up of a single piece of pipe casing or other items that it may be desired to move without disturbing other elements. It will be noted that a bell crank 272 having the finger 238 at one end is pivoted at 274 intermediate its length to the bracket 244, and having its other end connected to a clevis 276 actuated by a rod 278 in a cylinder 280 adapted to receive fluid, either oil or air under pressure.

Referring again to FIG. 5 it will be noted that four cables 232 extend between and are connected to the lifting platform 230, and are wrapped around longitudinally and laterally spaced drums 282, 284, 286 and 288 carried by the travelling crane trolley 234. These four drums are driven in synchronism by interconnected electric motor 290 and brake mechanisms 292 driving through oppositely extending shafts 294 and 296. The shaft 294 is connected through a differential mechanism 298 to drive the drums 282 and 284 at one end of the travelling crane trolley, and the shaft 296 is connected through a right angle drive 300 to drive the drums 286 and 288 at the opposite end of the trolley 234 in unison. The lifting platform 230 may thus be lowered and elevated relative to the trolley 234, being maintained at all times accurately in precise parallelism therewith.

The lowering of the platform 230 is controlled by a depending feeler member adapted to engage the uppermost layer of pipe in one of the compartments 200 to 208 to actuate a switch to de-energize the drive to the motors 290 and to engage the brakes 292 to progressively check the vertical descent of the lifting platform 230 to position the fingers 238 in a desired vertical adjustment relative to the top layer of pipe in the compartment. The upward movement of the lifting platform is correspondingly controlled and checked by a depending feeler mechanism to permit the lifting platform 230 to come to rest with the snubbing blocks 270 in engagement with the support structure 268 of the trolley 234.

The travelling trolley 234 is moved laterally by an electric motor drive 302 on the tracks 236 in a known manner.

In order to conserve space we prefer to employ a plurality of trolleys 234 operating on tracks positioned at the same level. It will be understood that a plurality of trolleys may be employed, at least one trolley being provided for engaging and moving each different size of pipe or casing. It will also be apparent that if desired, brackets 244 having fingers 238 set at a desired spacing to accommodate pipe or casing of a particular diameter may be substituted on one of the lifting platforms 230 to accommodate pipe or casing of different diameters.

Referring to FIG. 4 it will be noted that the left-hand side illustrates a lifting platform 230 as being suspended beneath a travelling trolley 234, the lifting platform having casing 304 engaged by the fingers 238. As shown in dotted lines, larger size casings 306 may be carried by spaced ones of the gripping fingers 238. As illustrated on the right-hand side of FIG 4. it will be noted that another lifting platform 230 is suspended beneath a travelling trolley 234, the fingers 238 of the lifting platform engaging pipe 214. It will of course be apparent that the casing may vary between the size represented by 304 and 306 to provide the necessary casing for ensuing drilling operations, and that pipe 214 of different sizes may also be employed, it being common practice to utilize pipe which does not have as wide a variation in size as does the casing.

As shown in the upper left-hand portion of the FIG. 5 illustration, one of the travelling trolleys 234 is shown in assembled relation with the longitudinal movable trolley 264 aligned to move longitudinally of the submarine on the rails 308. Referring to the upper midsection of FIG. 5 it will be noted that a travelling trolley 234 has moved into a longitudinally movable trolley 264 and has been locked therein. The longitudinal movable trolley 264 is shown as having moved longitudinally on the rails 308 into the pipe checking compartment 184. Suitable electric motor drive and brake mechanisms carried by the longitudinally movable trolley 264 are employed to power the unit for movement longitudinally in the submarine.

The movement of a travelling trolley 234 to a designated compartment 200 to 208 in either of the pipe and casing storage compartments 180 and 182 may be controlled from a remote point by a remotely operable flag stop member movable angularly into the path of travel of the trolley 234 for engagement by a feeler member as previously described for de-energizing the driving motor and engaging the brake mechanism to position the travelling trolley at the desired location. By the utilization of suitable counter mechanisms it will be apparent that all of the pipe can be withdrawn from one compartment and when the supply of pipe has been exhausted from that compartment, the flag stop can be actuated from the counter mechanism to automatically position the trolley to withdraw pipe from the next adjacent compartment. This process can be continued until all of the pipe available has been used. In returning pipe to the storage compartments this operation is of course reversed to maintain accurate control over the positioning of the pipe in the various storage compartments of the submarine. It will, of course, be apparent that T rails 220 and 222 carried by the bulkheads 210 and 212 may be removed and replaced by others to accommodate pipe or casing of different diameters. It will be apparent that if desired the T rails 220 and 222 may be positioned in place in a compartment before the pipe is deposited therein. The pipe-engaging fingers 238 being sufficiently narrow to fit between the laterally spaced T supports to engage a desired row of pipe. It will also be apparent that if desired a horizontal row of T blocks can be introduced or removed at opposite ends of the compartment each time a layer of pipe is introduced or withdrawn.

When the travelling longitudinally movable trolley 264 has moved into the pipe checking and cleaning compartment 184 as shown in FIGS. 5 and 9, a row of pipe carried by the lifting platform 230 of the travelling trolley 234 is shown in FIG. 9 as being lowered onto a stationary platform formed of two transversely extending rails 322 and 324, shown in FIGS. 9 and 10, suspended by the longitudinally extending rails 326. The rails 322 and 324 which support the pipe 214 are suspended by a plurality of spaced stanchions 328 secured at their upper ends to the hull structure of the submarine. As shown in FIG. 9 a layer 330 of pipe 214 is shown as supported by the longitudinally spaced rails 322 and 324. A second layer of pipe 332 is shown as being engaged by the fingers 238 of the lifting platform 230. It will be noted that a plurality of separators 334, shown in FIGS. 9 and 11 to maintain the individual lengths of pipe or casing 214 in spaced apart relation, are secured to a shaft 336 journalled at opposite ends as at 338. The shaft 336 is provided with a depending crank 340 adapted to be engaged by a rod 342 slidably mounted in a cylinder 344 and actuated by any desired fluid pressure to oscillate the separators 334 from an upright operative position to a horizontal inoperative position when they are positioned beneath the supporting surface of the transversely extending rails 322 and 324. Attention is directed to the fact that two sets of separators 334 are employed, one associated with each of the transversely extending rails 322 and 324 to engage the pipe 214 adjacent its opposite ends so as to maintain it in desired alignment.

Individual lengths of pipe 214 are removed from the stationary support defined by the transversely extending rails 322 and 324 by lowering the length of pipe positioned adjacent the right-hand end downwardly to a second indexing transfer mechanism 346 as shown in FIG.

9 positioned beneath the rails 322 and 324. It will be noted that as successive lengths of pipe 214 are removed from the right-hand side, the remaining lengths of pipe are then indexed over one space. It will be noted that as the right-hand-most lengths of pipe on the rails 322 and 324 are lowered onto the indexing transfer mechanism 346 where the pipe is successively transferred to a plurality of space stations where different operations may be performed on the pipe and at the final stage it may be grasped by a rocking arm to move it to a position to be engaged by a transfer arm which moves the pipe into operative relation in the derrick 94 in the embodiment of FIG. 2 and 58 in the embodiment of FIG. 1.

Referring now more particularly to FIGS. 10 and 11 the pipe indexing mechanism will now be described in detail. It will be noted that longitudinally spaced shafts 348 having a plurality of spaced separators 350 adapted to maintain a desired spaced relation between the individual lengths of pipe 214. The shaft 348 is mounted for oscillation in journals 352, and is movable longitudinally of its axis by a fluid pressure operated piston rod and cylinder 354. It will be noted that as shown in FIG. 11 the journals 352 move with the shaft 348, and that another shaft 356 is employed to provide a desired degree of rigidity to the indexing and transfer mechanism. The journals 352 are movably mounted on stationary shafts 358 fixed to brackets 360 carried by the transversely extending rails 322 and 324. It will be noted that the shaft 348 is reciprocated through a centrally disposed transfer bar mechanism 362 engaged by the piston rod and cylinder 354. Attention is directed to the fact that the piston rod is connected to a connector block 364 secured to the transfer slide 362. It will be noted that the shaft 348 having the separators 350 thereon is shown in the indexed position to move a length of pipe 214 into the station positioned adjacent the right-hand side of the transversely extending rails 322 and 324. When the shaft 348 has thus been moved toward the adjacent wall of the cylinder 90 as viewed in FIG. 9, and after the pipe has been indexed the separators 334 are rocked upwardly by actuation of the piston and cylinder combination 342 and 344 to maintain the pipes in their indexed positions. The shafts 348 are provided with pinions 366 engaging racks 368 actuated by a rod 370 operably mounted in a cylinder 372 to rock the separators 350 downwardly out of engagement with the pipe 214. The transfer slide is then retracted by the cylinder and piston arrangement 354 to the initial position whereupon the shaft 348 is again oscillated to elevate the separators 350 into a new engaging position relative to the remaining lengths of pipe on the rails 322 and 324 preparatory to the next indexing cycle at which time the separators 334 are rocked to the inoperative position by movement of the piston rod 342 in the cylinder 344.

Referring to FIG. 9 it will be noted that the transversely extending rails 322 and 324 are interrupted short of the last station to which pipe is indexed and that spaced elevating pads 374 and 376 are provided to receive pipe when moved to the vertical transfer station. When, as shown in FIG. 9 a length of pipe 214 has been positioned on the pads 374 and 376, the pads 374 and 376 are carried by an elevating slide 378. As shown in FIG. 10 the slide 378 is provided with a plurality of reinforcing webs 382 in which is journalled a rod 384 extending longitudinally of the pipe 214 opposite ends of the rod 382 are provided with pinions 386 engaging in vertically extending racks 388 fixedly mounted. Means are provided to elevate and lower the slide 378. One suitable form of motion transmitting means consists of a rod 390 slidably mounted in a cylinder 392 and actuated by any desired fluid pressure. It will be noted that by this construction the pipe is transferred from the indexed position downwardly to the loading station of the second indexing and transfer mechanism 346. As shown more clearly in FIG. 10 the slide 378 is maintained for accurate parallel movement by means of the shaft 384 and the pinions 386 engaging the racks 388. As the slide 378 moves toward its lower position the pipe 214 is moved downwardly into the loading station 394 of the indexing and transfer mechanism 346. As shown in FIG. 9 spaced pipe locators 396 adapted to engage opposite sides of the pipe 214 are moved into operative position to hold the pipe. Attention is directed to the fact that an indexing and transfer mechanism similar to that previously described is employed to move individual lengths of pipe successively to the various stations 398, 400, 402, 404 and 406 and then to a transfer station 408. It will be noted that stations 398 to 406 are spaced apart to permit the performance on the box and pin ends of pipe of different operations such as brushing, cleaning, checking, lubricating and other functions as may be required to avoid malfunctioning of the pipe 214 as it is assembled into the drill string. The checked and lubricated pipe may be removed from the transfer station 408 by means of rocking arms 410 having jaws 412 actuated by a linkage 414 operated by a suitable piston and cylinder combination 416. The rocking arms 410 are pivotally mounted on shaft 418 which in turn is mounted in the journals 420 as shown in FIG. 11. The rocking arms 410 are then moved by oscillation of the shaft 418 from the vertical position to the position illustrated in FIG. 9 where the rocking arms 410 are disposed somewhat above the horizontal position to place the pipe 214 in a convenient location where it can be grasped by the transfer arm to move the pipe into the derrick structure. It will be noted that the shaft 418 is provided with a pinion 422 adapted to engage a rack 424 driven by a piston rod 426 slidably mounted within a cylinder 428 whereby the rocking arms 410 may be actuated smoothly and to the desired position where the pipe may be grasped by the transfer arm.

Referring now to FIG. 9 it will be noted that a pipe rejecting mechanism is provided at the station 406. Pipe grasping tongs 430 actuated by a linkage 432 powered by a cylinder and piston combination 434 may be employed to grasp a pipe. A lifting mechanism consisting of cables 436 carried by a travelling crane 438 may be employed to permit lifting a rejected pipe 214 out of the station 406 and depositing it into one of a plurality of bins 440. Attention is directed to the fact that this pipe reject mechanism may function automatically to withdraw an unacceptable pipe out of the line automatically and deposit it in one of the bins 440 in which space is avilable for the reception of the pipe. If desired, bins 442 may be provided for the storage of other elements which may be required in the drill string. Such, for example as drill collars, coring equipment, etc.

It will be noted that when drilling the well the flow of pipe through the mechanism is from left to right on the transversely extending rails 322 and 324, and from right to left on the second indexing mechanism 346. When withdrawing pipe from the ground, as, for example to change a drill bit or for any other reason the flow of pipe through our improved apparatus is reversed, and the operations heretofore described are also reversed.

Referring to FIG. 9 it will be noted that the pipe handling mechanism previously described is in the area of the right-hand side 450, and that casing handling mechanism is provided in the left-hand side 452 of the hull 90 of the submarine. The casing index mechanism shown in area 452 of FIG. 13 is operated in substantially the same way as the drill pipe indexing mechanism. Attention is directed to the fact that casing is delivered to the area 452 by the travelling trolley as described with respect to FIG. 5. It will be noted that casing which may vary in diameter from 6⅝ inches to 20 inches may be lowered into the first indexing position. Casing of desired diameter may be lowered onto a transfer mechanism 454 and may be shuttled laterally toward a rocking arm position 456 as shown on FIG. 13 by mechanism similar to that previously described in connection with the transfer of pipe to the rocking arms 410. In view of the fact that casing varies through wide limits the separators 458 are removable and replaceable as desired to provide therebetween ample space to receive casing varying diameters. The index stroke of the transfer mechanism 454 can be varied by positioning various lengths stops adapted to engage with the index mechanism. It will be noted that the rocking arm 456 pivots about the center 464. In handling different diameter casing the center of the casing shifts to the position 468 in order to deliver the casing from the transfer station 462 to the position 466 it is necessary to move the pivot point of the arm 456 on the arc 470 to maintain constant distance between the center of the casing 468 and the pick up point 466. It is to be noted that the pivot point 464 is shifted in such a manner as to make the distance 464 to 466 the same as the distance 464 to 468.

As shown in FIGS. 9 to 12 the pipe 214 is engaged by the rocking arms 410 and the rocking arm is moved from a vertical to a position slightly above the horizontal position, the pipe 214 being maintained parallel with the longitudinal axis of the submarine. Referring to FIG. 14 it will be noted that the pipe 214 is engaged in the jaws 412 of the rocking arms 410. A pair of pipe gripping jaws 480 longitudinally spaced relative to each other close around the pipe to engage it at points staggered longitudinally relative to the rocking arm jaws 412. The jaws 412 of the rocking arms 410 then disengage the pipe, and the rocking arms 410 are moved downwardly from the horizontal to the substantially vertical position to pick up another piece of pipe. The pipe gripping jaws 480 have releasable jaw inserts 482 adapted to engage as shown in FIGS. 16 and 17. The jaw inserts 482 are carried by oppositely movable slides 484 having axially extending gibs slidably in gib plates 488. The gibs 486 may be moved to pipe or casing engaging position by means of fluid actuated cylinder and piston combinations. The cylinder and piston combinations are more clearly illustrated in FIG. 17 and consist of spaced cylinders 492 and 494 mounted in back-to-back relation and having slidably mounted therein pistons having rods 496 and 498 operably connected to the slides 484 in such a manner when actuated the jaw inserts 482 are moved to gripping engagement with the pipe or casing. It will be noted that the cylinders 492 and 494 are secured to a plate 500 to which the gib plates 488 are secured.

Referring to FIG. 16 it will be noted that the pipe gripping jaws 480 are secured to a channel shaped gib slide 502. The channel shaped gib slide 502 has laterally extending gib sections 504 slidable within a gib plate 506 in such a manner that the gib slide 502 with the pipe gripping jaws 480 having the pipe 214 in place therein is movable longitudinally on a channel shaped support member 508. The gib slide 502 is movable longitudinally of the channel shaped member 508, power being supplied for effecting this movement through a rod 510 projecting into and having a piston slidably mounted within a cylinder 512 secured to the channel shaped member 508. It will thus be apparent that a pipe 214 secured in the pipe gripping jaws 480 may be moved axially relative to the channel shaped member 508 to vary the endwise location of the pipe in relation to a transfer arm 514 to which the channel shaped member 508 is supported.

Continuing to refer to FIG. 14 it will be noted that the left-hand end of the transfer arm 514 is hinged at 516 to an elevating trolley 518 mounted for movement vertically on guide rails 520 secured to vertically extending support members 522 carried by the derrick portion 58.

The elevating trolley 518 is mounted on vertically spaced wheels 524 and 526 carried by the elevating trolley 518 and engaging the stationary guide rails 520. It will be noted, as shown in FIG. 15, that the outer edges of the guide rails 520 are provided with geared rack segments adapted to be engaged by pinions 528 carried by the elevating trolley 518 and driven by suitable motion transmitting means, such for example as the hydraulic motor and the speed reducing combination 530 which drives the pinion gears 528 to elevate or lower the elevating trolley in the central cylindrical section of the submarine in the dome 60. It will be noted that as the elevating trolley 518 moves upwardly the transfer arm 514 pivots about the hinge 516. The outer end of the transfer arm 514 is guided by links 532 pivoted at 534 in a bracket 536 carried by the outer end of the transfer arm 514. The opposite end of the links 532 is pivoted at 538 to a bracket 540 secured to the upper central portion of the cylinder 90 as more clearly shown in FIG. 16. It will thus be apparent as the elevating trolley 518 moves upwardly the outer end of the transfer arm 514 is pivoted downwardly, being guided by the links 532 to move the transfer arm 514 to a vertical position as shown in the dotted line position 542, the guiding links 532 moving from the full line position to the horizontal dotted line position 544.

It will be noted that when the elevating trolley 518 is in the upper position the transfer arm is vertical with the pipe 214 with its center line position as illustrated at 546. In order to connect the pipe into the drill string between a drill head 548 and a safety chuck 550 which holds the drill string 552, it is necessary to move the center line of the pipe being held in the pipe gripping jaws 480 from the position 546 to dispose its center line coincident with the drill string having its center line at 554. It is thus necessary that the channel section 508 be shifted laterally from the horizontal position shown in FIG. 14 to the position shown in dotted lines in the vertical position of FIG. 14. To accomplish this movement two pairs of longitudinally spaced bell cranks 556 and 558 are pivotally interconnected between the channel member 508 and the transfer arm 514. One end of the bell cranks are pivoted at 560 to laterally projecting ears 562 carried by the transfer arm 514. The other end of the bell cranks 556 and 558 are pivoted at 564 to the channel shaped member 508. It will thus be apparent that the channel shaped member 508 is pivotally supported by the transfer arm 514 and may be moved laterally therefrom by a parallelogram movement so that parallelism is maintained between the channel shaped member 508 and the transfer arm 514. This lateral movement of the channel shaped member 508 relative to the transfer arm 514 is effected by fluid actuated power units consisting of cylinders 566 pivoted at 568 on the transfer arm 514. Pistons having rods 570 pivoted to the bell cranks 556 and 558 at 572 are employed to move from the contracted position illustrated in full lines at the bottom of FIG. 14 to the extended position illustrated in dotted lines in the vertical position of FIG. 14 to extend the center line of the pipe 214 from the position illustrated at 546 laterally to the position illustrated at 544 when the pipe 214 is in alignment with the drill string 552.

It will be apparent that when the pipe 214 is disposed with its center line 554 in alignment with the drill string it is necessary that the pipe be held with a sufficient force that a threaded connection can be made with a drive quill 576 of the drill head 548. It is therefore necessary that suitable locking or clamping means be employed to engage the channel member 508 to securely hold the pipe in the laterally spaced position to which it has been moved.

Referring to FIG. 16 it will be noted that the upper end of the elevating trolley 518 is of generally horseshoe configuration. As shown in the lower portion of FIG. 14 the transfer arm 514 extends horizontally from the elevating trolley 518 in substantially a right angular relation. As viewed in the elevated position as shown in FIG. 16, the transfer arm 514 is in the vertical position at which time the transfer arm is straddled by the horseshoe section of the elevating trolley 518, the transfer arm extending in parallelism with the trolley 518 as shown in the upper portion of FIG. 14.

Referring again to FIG. 14 it will be noted that a pipe 214 is illustrated as being carried by the transfer arm 514 but it will also be apparent that a casing 574 can equally well be carried thereby by a mere change of the jaw inserts 482 of the gripping jaws 480.

Attention is directed to the fact that the bell cranks 556 and 558 are actuated to shift the channel shaped member 508 laterally to dispose the pipe in alignment with the drill string when pipe is being added to the string during the drilling operation. When pipe is being withdrawn from the well, as for example to change a bit, the channel shaped member is maintained in the retracted position as shown in FIG. 14 where the center line of the pipe 214 is positioned as shown disposed at 546, the pipe being transferred by an intermediate carriage mechanism 578.

FIG. 18 shows the derrick 58 of the submarine A illustrated in FIG. 1, or the submarine C illustrated in FIG. 2. As previously described, the derrick 58 receives a length of drill pipe 214 delivered in the vertical position by the clamps 480 of the transfer arm 514. It will be noted that the longitudinal axis of the pipe 214 is aligned with the axis of the drill spindle quill 576 carried by the drill head 548.

The lower end of the drill spindle quill 576 is threaded as illustrated at 580, more clearly shown in FIG. 24 to provide a drive through the box end 582 of the drill pipe 214. The drill spindle quill 576 is rotated slowly and the drill head 548 descends gradually, being guided by the rollers 584 and 586 engaging in the trackways 588.

It will be noted that the vertical position of the drill head 548 on the trackways 588 is controlled by vertically extending rods 590. The rods 590 have pistons slidably mounted in cylinders 592, fluid, preferably oil under pressure being admitted to the bottom of the cylinders to control the upward movement of the rods and the drill head 106, downward movement being controlled by venting the hydraulic fluid from the cylinders 592 and permitting the drill head 548 to descend under controlled hydraulic venting of the oil from the cylinders 592.

As more clearly described in connection with FIG. 24, the drill spindle quill 576 is rotated and it is lowered gradually to mating engagement with the box end 582 of the drill pipe 214. The speed of rotation of the quill 576 and its rate of descent is proportional to the lead of the threads 580. The quill 576 continues to rotate in the box end 582 of the pipe 214 until the quill 576 has fully seated with respect to the box end 582 of the drill pipe 214 and been tightened therewith. A tight driving connection is thus effected between the quill 576 and the pipe 214 through which torque required to rotate the entire drill string can be transmitted. This tightening of the quill 576 relative to the pipe 214 is controlled by hydraulic pressure developed in the hydraulic motors as described in connection with FIG. 24.

When a tight connection has been established between the quill 576 and the pipe 214 the clamps 480 of the transfer arm 514 are released leaving the pipe 214 supported by the drill spindle quill 576.

While this action is going on a so-called knocker chuck 594 having spaced rollers 596 and 598 moves upwardly on the trackway 588 of the derrick 58 to the full extent of its permissible travel as determined by the movement of a plurality of pistons 600 slidably mounted in spaced cylinders 602 secured to the derrick 58. As more clearly illustrated in FIGS. 19 and 25 when the knocker chuck 594 is in the elevated position, a plurality of spaced pipe guides 604 are moved radially inwardly to engage the lower end of the pipe 214 above the pin end 606 of the tool joint. The pipe is thus centered in the chuck and it is accurately guided in alignment with the box end 608 of the uppermost pipe of the drill string 552 held in spaced relation by a safety chuck 550 secured adjacent to the bottom of the derrick 58. As the drill spindle quill 576 and the pipe 214 carried thereby continues to rotate and move downwardly the threads of the tool joint 606 engage the box end 608 of the uppermost pipe of the drill string 552. When the joints 606 and 608 of the pipe 214 and the uppermost pipe of the drill string 552 engage each other, the pipe 214 is rotated and descends relative to the uppermost pipe of the drill string 552 until the hydraulic motors stall out. When the slack has been taken up, a set of chucks 610 as shown in FIG. 25 are moved radially inwardly by pistons 612 movably mounted in cylinders 614 to hold the uppermost pipe of the drill string 552 against rotation.

Another set of chucks 616 carried by a rotatable gear 618 is moved radially inwardly to engage the tool joint 606 by means of pistons 620 operating in cylinders 622. When the chucks 610 have engaged the tool joint 606 the rotatable gear 618 is actuated by a rack 624 controlled by a cylinder 626 whereupon the chucks 616 are rotated relative to the chucks 610 until a desired degree of torque is obtained as indicated by the pressure exerted within the cylinder 626, at which time the tool joint 606 has been tightened with respect to the box end 608 of the uppermost pipe of the drill string 552 to a desired degree to prevent leakage and to insure against separation of the pipes during the drilling operation.

When the pipe 214 has thus been engaged by the drill head spindle quill 576 and the uppermost pipe of the drill string 552, the drill head 548 is moved upwardly in the derrick 58 a small distance to enable it to pick up the entire weight of the drill string 552 consisting of the uppermost pipe 214a and all of the lengths of pipe connected thereto. When the fluid pressure in the cylinders 592 is sufficient to pick up the weight of the drill string 552, a safety chuck 550 releases the uppermost pipe 214a of the drill string as shown in FIG. 28, whereupon the drill head 548 is free to feed downwardly on the tracks 588 in the derrick 58 as the drill head quill 576 is rotated to drive the cutter secured to the lower end of the drill string 552. Attention is directed to the fact that prior to the drill head 548 picking up the weight of the drill string 552, the weight of the drill string was supported by jaws 628 of the safety chuck 550 engaging uppermost pipe 214a as shown in FIG. 27. It will be noted that during the drilling cycle the weight imposed on the drill bit can at all times be controlled by the fluid pressure in cylinders 592.

Referring now in more detail to the safety chuck 550 as illustrated in FIGS. 27 and 28, it will be noted that the chuck has a set of jaws 628 adapted to grip a pipe of a diameter as illustrated by the pipe 214a. The safety chuck also has a set of jaws 630 adapted to grip a pipe of a larger diameter than the pipe 214a. This is necessary because in drilling operations it frequently happens that pipe of two, or possibly even three diameters are used simultaneously in the same drill string.

It will be noted that the jaws 628 are controlled by pistons 632 movably mounted in cylinders 634. The jaws 628 have an inclined bearing surface engaging the inclined surface of the jaws 630 so that as the jaws 628 move upwardly they move radially outwardly as shown in FIG. 28. It will thus be apparent that if a larger diameter pipe is being clamped the jaws 630 will engage the pipe. If a smaller diameter pipe is being clamped the pipe will be engaged by the jaws 628 shown in the relative position shown in FIG. 27. FIG. 28 illustrates a large diameter pipe being clamped by the jaws 630. The jaws 630 are removable jaws positioned in a suitable retainer body 636 carried by a platen 638, and actuated by pistons 640 slidably mounted in cylinders 642.

It will be noted that the wedge 636 is slidably mounted through radially extending ways 646 to a gib 648 of the platen 638. The jaws 628 are slidably connected through radially extending ways 646 with gibs 648 of the platen 650. The jaws 630 may be actuated to grip or release a pipe by actuating the cylinders 642 without disturbing the desired position of the jaws 628 controlled by the cylinders 634. The platens 638 and 650 are mounted on vertically extending rods 652 secured through a cover plate 654 to the platen 650 and slidable vertically through bosses 656 of the safety chuck 550. The jaws 628 and 630 have serrated inserts 658 and 660 respectively. The jaws 628 and 630 may be removed and replaced by differently dimensioned jaws to accommodate different diametered pipe or casing.

The base 662 of the safety chuck 550 is secured to the lower section of the derrick 58 by suitable power clamps so that when desired it can be released and shifted to a different position where it may be locked in place for a subsequent operation.

The pipe guides 604 consist of guide blocks 664 carried by a head 666 mounted on rods 668 slidably mounted through radially disposed supports 670. The rods 668 terminate in pistons slidably mounted in cylinders 672 carried by pedestals 674 which in turn are carried by the body 676 of the knocker chuck 594.

When the pipe 214 is lowered into the knocker chuck 594 the pipe guides 604 are actuated to move them radially inwardly to engage the pipe after the pin end 606 of the tool joint has passed beyond the pipe guides 604. The pipe 214 rotates and moves downwardly through the guide blocks 664. No serious abrasion of the pipe results because the guide blocks 664 are formed of abrasion-resistant material such, for example as a plastic or an iron shoe.

The rotatable gear 618 mounted in vertically spaced bearings 678 has a slide assembly 680 secured thereto, the cylinders 622 which receive the pistons 620 for actuating the chucks 616 being carried by the slide assembly 680. The chuck 616 and the gear 618 are rotated by the rack 624 preferably of the straight type and guided by spaced keys 682 positioned in the body of the knocker chuck 594.

A bowl chuck 684 as shown in FIG. 26 has radially movable jaws 686 carried at the lower end of the knocker chuck 594. The jaws 686 are moved radially inwardly by pistons 688 slidably mounted in cylinders 690 secured in the body of the knocker chuck 594. The radially movable jaws 686 engage the box end 608 of the pipe 214a at the juncture between the section of increasing diameter 692 so as to support the weight of the entire drill string 552.

It will be noted that the bowl chuck 684 embodies auxiliary radially movable jaws 694 of a different diameter to engage pipe of a different size than the pipe 214a, the jaws 694 being selectively operable in lieu of the jaws 686. A safety device in the form of a plunger 696 actuated by a hydraulic cylinder 698 is provided to project into an aperture in the slide 700 which carries the radially movable jaws 686. Attention is directed to the fact that a block 702 of circular configuration split longitudinally and supporting the radially inner ends of the slide 700 may be removed from the knocker chuck 594 to permit repositioning the slide to facilitate the handling of larger diameter pipe or casing through the knocker chuck as the occasion may require.

Referring now to FIG. 24 it will be noted that the drill head 548 is mounted on the track 588 through the spaced rollers 584 and 586, and is controlled vertically by rods 590 having pistons slidably mounted in the cylinders 592.

The quill 576 is threadably connected to the spindle 704 at the lower end, the spindle 704 being journaled in vertically spaced bearings 706 and 708 for rotational movement. It will be noted that the spindle 704 has a radially extended boss 710 engaging a thrust bearing 712 engaging a conical shaped bearing 714 which in turn engages a reversely disposed race 716 engaging the main housing 718 of the drill head 548. It will thus be apparent that the entire weight of the drill string 552 carried by the threaded end 580 of the quill 576 is transmitted through the spindle 704 and bearing 714 to the housing 718 of the drill head in such a manner that the spindle 704 and quill 576 can rotate on the bearings 706, 708 and 714.

It will be noted that the drill spindle quill 576 is threaded at the upper end 720 to receive a hollow mud rod 722 through which mud may be pumped through the drill string to remove the cuttings as they are released and to balance pressure zones as they are encountered in the drilling operation. It will be noted that the upper portion of the quill 576 has a stationary sleeve 724 which is kept from rotating by the lock ring 726 during drilling operations. Ring 720 is slidably mounted in splines 728 and urged upwardly by a spring 730 against a resilient pad 732.

It will be noted that the quill 576 is hollow to permit mud to be pumped through it from the mud rod 722 to the space within the drill string. Attention is directed to the fact that the quill 576 may be removed from the drill head 548 when the drill string 552 is being removed from the hole to permit the replacement of a cutter or for any other reason.

To rotate the quill 576 and the drill string 552 carried thereby it is only necessary to drive the spindle 704. This is accomplished by positioning a ring gear 734 on the race portion 710 of the spindle 704, a pinion gear 736 journaled in suitable bearings 738 engaging the gear 734. The drive is through a clutch coupling 740, the driving shaft 742 of which may be driven by a hydraulic motor 744 in a known manner. The anchor block 746 is adapted to release the piston rods 590 for disassembly purposes.

A make-up chuck 750 is positioned at the top of the drill head 548. The make-up chuck 750 is used to facilitate the disassembly of the pipe when the drill string is withdrawn from the ground to replace a bit or for any other reasons. When it is desired to pull the pipe string the quill 576 and the mud rod 722 are removed, whereupon radially disposed jaws 752 are adapted to grip pipe during removal and replacement of the drill string 552. The radially disposed jaws 752 are power actuated downwardly by the clamp ring 754. Positioned at the upper and lower ends of the clamp ring 754 are bearings 756 which permit the clamp mechanism to rotate with the drill pipe as may be required. The clamp ring 754 is adapted to be moved to a clamped and unclamped position by means of a cylindrical guide 758. Positioned at the lower extremity of the guide 758 is a flange 760 which is fixedly mounted to the piston rod 762. The rod 762 is actuated by the cylinder 764 which is mounted to the cylindrical guide member 766. It will be further noted that the radially disposed jaws 752 receive a rotational motion from the power ring 768 through the dovetail 771.

Attention is directed to the fact that in performing a well-drilling operation there are two distinct cycles of pipe handling involved.

The first is the drilling cycle wherein pipe is added, a length at a time in the so-called drill string through the substantially automatic pipe handling and connecting mechanism carried by the derrick 58.

The other sequence is the so-called "trip" sequence wherein pipe is withdrawn from the drilled hole. The lengths of pipe are individually separated from the drill string and when the entire drill string has been removed the new drill bit is replaced on the end of the first length of pipe. The drill string is again connected up in the same general manner as heretofore described, it being noted that no load is imposed on the drill bit until the drill string has been fully replaced to engage the drill bit with the undrilled formations at the bottom of the hole. Since no loads are imposed on the drill bit during the "trip" cycle, it is possible to quickly engage and disconnect the successive lengths of pipe since it is unnecessary at that time to rotate the drill string.

The operation to perform a drilling cycle is as follows. A length of pipe 214, as shown in FIG. 14 is engaged by the pipe gripping jaws 480 and is elevated and oscillated by the movement of the transfer arm 514 from the horizontal position to the vertical position illustrated in the dotted line position 542 in FIG. 14. The bell cranks 556 then move the channel-shaped member 508 laterally to position the axis of the pipe 214 at 554 in alignment between the quill 576 and the drill string 552. It will be noted that the pipe 214 is still held in the pipe gripping jaws 480 as illustrated in FIG. 18.

As shown in FIG. 18 the pipe 214 is suspended above the uppermost pipe of the drill string 552 with its pin end 606 in mating relation with the box end 608 of the uppermost piece of pipe in the drill string 552. The box end 582 of the pipe 214 is in alignment with the drive quill 576 carried by the drill head 548.

The drill head 548 is shown in greater detail in FIG. 24. The drill head 548 is slidably mounted for vertical movement on the rods 590 secured in the derrick 58. The vertical movement of the drill head 548 is controlled by cylinders 592. The drill head 548 may be automatically controlled by suitable limit switches actuated by movement of the transfer arm 514 to the vertical position illustrated in FIG. 14, the limit switches being actuated only after the bell cranks 556 and 558 have been actuated by their power units 566 to align the pipe 214 between the quill 576 and the drill string 552 as illustrated by the center line 546 of the pipe 214. When the limit switches have thus been actuated, the drill head 548 is lowered on the rods 590 through the cylinders 592 until the thread 580 on the drive quill 576 engages the box end 582 of the pipe 214. The quill 576 is rotated by the drive mechanism illustrated in FIG. 24.

When the drive quill 576 has been tightened with the upper end of the pipe 214 the controlled hydraulically actuated drive stalls out, whereupon the pipe 214 is securely held in the drive quill 576. The jaws 480 of the transfer arm 514 are then disengaged and are retracted by oscillation of the bell cranks 556 and 558. The transfer arm 514 is then oscillated back to the horizontal position illustrated in the lower portion of FIG. 14 where it is ready to engage another piece of pipe.

The drill head 548 and the connected pipe 214 move downwardly with the box end 606 of the pipe 214, being guided by the pipe guides 604 of the knocker chuck 594 into accurate alignment with the exposed box end 608 of the uppermost pipe 214, as illustrated more clearly in FIG. 25.

The pipe 214 is rotated as it is guided into a mating relation with the box end 608 of the drill string 552. The pipe 214 continues to rotate until the joint is seated whereupon the hydraulic drive motors in the drill head 548 stall out. The knocker chuck 594 then moves upwardly from the position illustrated in FIG. 18 under controlled hydraulic power supplied by the cylinders 602 to a position illustrated in FIG. 25.

The radially disposed chucks 610 and 616 are then shifted inwardly into clamping engagement with the box end 608 and the pin end 606 respectively. The cylinder 626 is then actuated to move the rack 624, thus rotating the gear 618 and the chuck 616 thereby imparting a final torque to the joint connection. The chucks 610 and 616 are then retracted by their respective cylinders and the cylinder 626 recocks itself for the next cycle of operation.

The pressure in the cylinders 592 is then increased to support the weight of the drill string 552 whereupon the safety chuck 550 is actuated to release the uppermost pipe 214a of the drill string 552. The drill head 548 then carries the full weight of the drill string 552, and the pipe string is rotated by the drill head 548.

The drilling operation then progresses until the drill string has descended a distance equal to one pipe length whereupon the driving rotation is interrupted, and the safety chuck 550 is actuated to engage the uppermost piece of pipe in the drill string 552. The driving quill 576 is then released from the upper end of the pipe 214 by unthreading the joint between the drive quill 576 and the box end 582 at the upper end of the pipe 214. The drill head 548 then moves upwardly to the position illustrated in FIG. 18 whereupon it is ready to receive the next length of pipe from the transfer arm 514 illustrated in FIG. 14.

Attention is directed to the fact that in the performance of the drilling operation, mud having a desired consistency is introduced through the mud tube 722 and is pumped down through the drive quill 576 and the full length of the drill string 552, through the drill bit at the lower end of the drill string and upwardly around the outside thereof to carry off cuttings from the drilling operation. The mud is retrieved at the end of the cycle and is reprocessed for reuse in the drilling operation.

It will be noted that as the drilling operation progresses the drill head 548 moves downwardly on the rods 590 under the control of the rollers 584 and 586 as illustrated in FIG. 24. The mud tube 722 consists of a hollow piston rod slidably mounted in a cylinder 770 superimposed on the derrick 58. As shown in FIG. 20 the hollow piston 722 is provided with a guide 772 slidably mounted in the cylinder 770 mounted on the derrick 58. Mud may be supplied to the cylinder 770 through a suitable inlet 774 communicating with the cylinder 770, the mud flowing freely through cut-out sections 776 as illustrated in FIG. 21. The cylinder 770 has a flange 778 adapted to be engaged by an arcuate gib 780. A suitable sealed gland 782 is positioned between the lower end of the cylinder 770 and the mud tube 722 to prevent the escape of mud at this point. As the drill head 548 moves downwardly in the derrick 58 the guide 772 moves downwardly in the cylinder 770.

To start a so-called "trip" cycle when it is desired to remove all of the pipe constituting the drill string 552 from the ground, as for example to change a drill bit, the mud rod 722 is removed by locking the driving quill 576 and unthreading the mud rod 722 therefrom. To perform this operation, the jaws 752 illustrated at the top of FIG. 24 engage the mud tube 722 and rotate it to unthread the connection 720 between it and the stationary sleeve 724 into which the driving quill 576 is threaded. The mud rod 722 is then elevated and the flange 778 is disengaged from the arcuate gib 780 whereupon the cylinder 770 with the mud tube 722 in place therein is rocked to a non-obstructing position. Attention is directed to the fact that the stationary sleeve 724 is adapted for rotation by means of a rotatable sealed gland positioned therein. This construction permits the spindle 704 and the drive quill 576 to rotate and receive mud flowing through the stationary mud tube 722.

The drill head 548 then descends to position the drive quill 576 in alignment with the knocker chuck 594. The knocker chuck 594 then engages the drive quill 576 and power is applied to unthread it from the stationary sleeve 724. The drill head 548 is then elevated leaving the drive quill 576 projecting above the upper surface of the knocker chuck 594. Suitable clamping jaws on the transfer arm 514 are then introduced to engage the drive quill. The knocker chuck 594 is then actuated to release the drive quill whereupon it is removed from operative alignment in the derrick 58.

It will be noted that when the mud tube 722 and drive quill member 576 with the stationary sleeve 724 in place therein have been removed, that the spindle 704 through the drill head is clear so that the individual pieces of pipe or components constituting the drill string can freely pass through the spindle 704. The drill head 548 now moves downwardly and engages with the knocker chuck 594. It will be noted that the knocker chuck has lock pins 784 adapted to project into suitable couplers 786 carried by the drill head 548. The lock pins 784 have an annular groove 788 to be received in a keyhole slot formed in the lock slides 790 carried by the couplers 786. This latching mechanism is automatically engaged by abutment of the drill head 548 with the knocker chuck 594, it being noted that when the lock pins 784 are in suitable position with the lock slide 790, the slides are moved to the engaging or locking position. The knocker chuck 594 is thus secured for vertical travel with the drill head 548. When the drill head 548 is coupled to the knocker chuck 594, the piston rods 688 are actuated to move the bowl chuck segments 684 into engagement with the uppermost section of pipe 214a of the drill string 552. With the uppermost pipe secured to the knocker chuck 594 pressure is exerted in the cylinders 592 controlling the vertical movement of the drill head 548. When sufficient pressure is thus exerted to support the weight of the drill string, the safety chuck 550 is released by withdrawing the jaws 628 as shown in FIG. 27.

The drill head 548 and knocker chuck 594 are then elevated to lift the drill string 552 a distance equal to the length of one pipe 214.

Referring to FIG. 22, it will be noted that the uppermost length of pipe of the drill string is identified by the reference numeral 214a. As shown in FIG. 23 the drill string has been elevated a distance equal to one length of pipe, the first length of pipe 214a being completely removed from the ground and a second piece of pipe identified by the numeral 214b being partially exposed.

The safety chuck 550 then is actuated to engage the pipe as shown in FIG. 27 at a point below the box end 608 of the uppermost piece of pipe 214b of the drill string. The knocker chuck 594 shown in FIG. 25 then releases the pipe 214a whereupon the drill head 548 and the knocker chuck move downwardly to engage the next section of pipe 214b of the drill string 552. When the knocker chuck jaws 684 of FIG. 25 engage the pipe 214b the safety chuck 550 is actuated from the engaging position illustrated in FIG. 27 to the disengaged position illustrated in FIG. 28.

With the pipe 214b thus engaged by the bowl portion 684 of the knocker chuck 594 the cylinders 592 are subjected to fluid pressure to move the drill head 548 upwardly on the rods 590.

As the drill head 548 is thus elevated the box end 608 of the lower piece of pipe 214b is engaged by the chuck 610 of the knocker chuck 594 (as shown in FIG. 25). The lower end or pin joint 606 of the upper piece of pipe 214a is engaged by the chuck 616 of the knocker chuck 594, and as the knocker chuck and drill head 548 move upwardly, the torque is applied through the chuck 616 by the gear 618 and rack 624 to rotate the upper pipe 214a with reference to the pipe 214b to loosen or release the threaded connection therebetween. It will be noted that as shown in FIGS. 19 and 24, the upper end of the pipe 214 is guided by the jaws 752 of the make-up chuck 750. Attention is directed to the fact that the jaws 752 of the make-up chuck 750 engage the upper end of the pipe 214a, and after the pipe joint has been released the make-up chuck 750 is actuated to spin out and separate axially (as shown in FIG. 19) the upper pipe 214a as the knocker chuck 594 and drill head 548 move upwardly in the derrick 58. It will be noted that as the upper length of pipe 214a is unthreaded from the length of pipe 214b that a third length of pipe 214c emerges from the ground and is exposed above the safety chuck 550. The make-up chuck 750 is energized to bring its jaws 752 into engaged relation with the pipe 214a, the conical outer surface of the jaws 752 being forced inwardly by the power ring 768. The power ring 768 being driven out by the pinion gear 767, which in turn is driven by the hydraulic motor 769 as illustrated in FIG. 24. During the unthreading operation constant upward force is maintained on the piston rod 763 of cylinder 765. As soon as the pipe 214a is unthreaded from the pipe 214b the cylinder rod 763 moves upwardly moving the cylindrical guide member 766 thus displacing the pipe 214a axially from the pipe 214b. It will be noted that the engaged relationship of the jaws 752 with the pipe 214a is maintained due to the cylinder 754 being mounted on the cylindrical guide member 766.

With the uppermost piece of pipe 214a thus held by the make-up chuck 750 the clamping jaws 800 carried by the rockable portion 802 of the upper transfer carriage 804 engages the upper pipe 214a as shown in FIG. 19 when the drill head 548 and knocker chuck 594 approach their uppermost position. When the uppermost pipe 214a has thus been engaged by the jaws 800 of the transfer carriage 804 the safety chuck 550 is actuated to engage the next piece of pipe 214c which, as pointed out above has emerged from the ground. The safety chuck grips the pipe 214c thus supporting the weight of the drill string 552. The bowl chuck 684 of the knocker chuck 594 releases its grip from the intermediate piece of pipe 214b. Simultaneous with the release of the bowl chuck 684 the uppermost piece of pipe 214a is released from the jaws 752 of the make-up chuck 750 by admitting fluid pressure in the rod end of cylinder 764 to move the jaws 752 upwardly to an unclamped position with respect to the pipe 214a, whereup the drilling head and knocker chuck assembly now move downwardly to a position adjacent the safety chuck 550. The bowl chuck 684 then engages the pipe 214c beneath its box end 608 to support the weight of the drill string 552. After the bowl chuck 684 has engaged the pipe 214c pressure is exerted in the cylinders 765 to lift the drill head 548. The bowl chuck 684 has thus assumed the weight of the drill string 552, the safety chuck 550 releases the drill string 552. The jaws 610 of the knocker chuck 594 then engage the box end 608 of the pipe 214c to restrain the drill string from rotating. The jaws 616 are actuated simultaneously to engage the pin end 606 of the intermediate drill pipe 214b whereupon the rotatable gear 618 and rack 624 are energized to break the connection between the pipes 214b and 214c.

It will be noted that during the entire time while the drill string is being carried by the bowl chuck 684 that the rods 688 are clamped in locking engagement with the plunger 696 which is actuated by the cylinder 698 as illustrated in FIG. 25.

After the threaded connection between the pipes 214b and 214c have been loosened the pipe 214b is unthreaded from the pipe 214c by the make-up chuck 750 while the drill head and knocker chuck are elevating as previously described.

As the drill head 548 and the knocker chuck 594 move downward the upper transfer carriage 804 is moved upwardly on guide rods 820 by means of a hydraulically actuated reduction gear and rack arrangement to a nonobstructing position vertically with reference to the derrick 58 as shown in FIG. 29. As shown in FIGS. 29 to 32 the rockable portion 802 which carries the upper pipe 214a is mounted through bearings 822 and 824 journaled on a sleeve 826 extending downwardly from the carriage 804. The rockable portion 802 is provided with a gear 828 adapted to be driven by a pinion 830 powered by a hydraulic unit 832 to oscillate the rockable portion 802 and the pipe 214a from the position shown at 834 in FIG. 32 to the position shown at 836. When in this position the pipe 214a is clamped by the jaws 838 of the intermediate carriage 578. The intermediate carriage 578 is movable vertically through guide rollers 842 and a pinion and rack arrangement 844 shown more clearly in FIG. 30. The pinions are actuated by hydraulic motors to elevate and lower the carriage 578 which carries the upper pipe 214a. The pipe is then engaged by the jaws 480 of the transfer arm 514. The jaws 838 of the transfer carriage 578 then release the pipe as shown in FIG. 14 and the pipe is lowered and oscillated from the vertical to the horizontal position after which it is returned to the pipe storage areas 442 through 448.

Referring now to FIGS. 33 to 35 it will be noted that the blow-out preventer tank 114 is attached to the hull 90 of the submarine C, illustrated in FIG. 2, and proves a chamber 900 separated from the space within the hull 90 by a passage 902 closed by a hatch 904. The bottom of the chamber 900 communicates through a passage 906 with the well-head compartment 120 of the production tank D, illustrated in FIG. 2. The well-head compartment 120 having a chamber 908 is provided with an upper passage 910 aligned with the passage 906 leading to the chamber 900 of the blow-out preventer compartment 114. The passage 906 at the bottom of the chamber 900 is sealed by a hatch 912 positioned within the chamber 900.

The passages 906 and 910 formed in the blow-out preventer 114 and the well-head compartment 120 respectively have substantially flat and smooth mating surfaces 914 and 916 respectively. Spaced annular seals 918 and 920 carried by the surface 914 are concentrically disposed in abutting relation with the surface 916 of the well-head compartment 120 to provide a fluid tight seal between the submarine C and the production tank D. The seals 918 and 920 may be subjected to fluid pressure to provide a highly efficient seal, it being understood that the submarine C and the production tank D are secured together by the clamps 118 illustrated and described in connection with the FIG. 3 embodiment.

The well-head compartment 120 is provided at its bottom with a passage 922 closed by a hatch 924, and providing an outlet through the bottom of the production tank D aligned with the central section of the derrick 58 in the central section 92 of the submarine C.

Ram gates 926, 928 and 930 are provided in the passages 906, 910 and 922 respectively to provide fluid-tight seals in the respective passages. The rams 926, 928 and 930 are illustrated more clearly in FIG. 35. It will be observed that one of the ram gates 926 is illustrated as being a large blade section 932 and a small blade section 934. Both blade sections have arcuately shaped end sections 936 and 938 providing an internal opening substantially corresponding with the diameters of the passages 906, 910 and 922. The blade sections 932 and 934 are actuated by rods 940 and 942 respectively having pistons 944 and 946 slidably mounted in cylinders 948 and 950 respectively.

When the gates are in the position illustrated in FIG. 33 it will be observed that the passage 906 is closed by the large blade section 932. When the pistons 944 and 946 are actuated to move them toward the left in their respective cylinders, the arcuate end sections 936 and 938 in the ends of the blades 932 and 934 align with the passage 906 to provide free access through the passage 906. The actuation of the gates 928 and 930 associated with the upper and lower ends of the well-head compartment 120 are similar to the construction and operation of the gate 926.

It will be understood that suitable resilient surfaces are formed on the upper and lower surfaces of the ram gates 926, 928 and 930 to provide a fluid-tight closure. As shown in FIG. 33 the gates 926, 928 and 930 are shown in the closed position. In the position illustrated in FIG. 35 the upper gates 926 and 928 are shown in the open position, and the lower gate 930 is shown in the closed position. The pistons 944 and 946 may be actuated in the opposite directions in their cylinders 948 and 950 by introducing fluid under pressure to opposite ends of the respective cylinders.

When preparing to drill a well the submarine C with the production tank D in place thereunder is readied for operation and is submerged to the well site. When the desired location has been selected and the submarine and production tank have nestled on the ocean bottom, the hatch 904 in the hull 90 of the submarine C is removed thereby permitting workmen to gain access to the chamber 900 through the passage 902 in the blow-out preventer compartment 114.

The hatch 912 is next removed to permit workman to gain access to the passage 906. The ram gates 926 and 928 are opened by introducing fluid under pressure into the right-hand end of the cylinders 948 thereby forcing the piston 944 to move toward the left end withdrawing the large blade section from the sealing positions in the passages 906 and 910.

Workmen can then gain access to the chamber 908 of the well-head compartment 120 through the passages 906 and 910. The hatch 924 is next removed, the gate 930 being held in the closed position to seal the chamber 908 against the ingress of sea water.

Referring now to FIG. 36 it will be noted that two telescoping sealing tubes 952 and 954 are introduced into the chamber 908. The lower tube 952 is bolted or otherwise secured through flanges 956 with a boss 958 formed around the passage 922 in the bottom of the well-head compartment 120. The upper tube 954 is telescoped within the tube 952, the space therebetween being closed by a seal 960, and the upper tube 954 is secured by its flange 962 to a boss 964 in any desired manner as by studs.

A combined chuck and gas blow-out preventer 966 positioned in the chamber 900 is moved to align its central section with the passage 906 in the blow-out preventer compartment 114, and it is secured in place by bolting or otherwise fastening its flange 968 to a boss 970 formed in the bottom of the blow-out preventer compartment 114.

Another pair of telescoping sealing tubes 972 and 974 are interposed between a flange 976 at the upper end of the chuck and blow-out preventer 966 and a boss 978 at the upper extremity of the blow-out preventer compartment 114. A flange 980 carried by the tube 972 is secured as by bolting to the boss 976, and a flange 982 of the tube 974 is secured to the boss 978 at the top. The tube 974 telescopes within the tube 972, a seal 984 being interposed therebetween to seal the space between the tubes.

A rotating blow-out preventer 986 is provided with a flange 988 bolted or otherwise secured to the boss 990 to which the hatch 904, illustrated in FIG. 33, was secured. The rotating blow-out preventer 986 has a removable portion 992 secured in any desired manner as by a bayonet locking connection to the rotating blow-out preventer 986. The removable portion 992 receives and guides the lower end of an adapter pipe 994 which, at its upper end carries the quill 576 which rotates the adapter pipe 994 and moves it vertically through the removable portion 992. Suitable seals are provided to engage the adapter pipe 994 and provide a secure seal between the pipe adapter and the space within the chamber 900.

The chuck and blow-out preventer 966 houses two pairs of vertically spaced rams 996 and 998 movable radially relative to the central section of the chuck and blow-out preventer 966 by means of fluid pressure actuated cylinder and piston combinations corresponding to the actuation of the ram gate 926 described above. The inner clamping faces of the ram gate 996 are arcuately shaped to receive and clamp a casing 1000 to hold a string of casing members and to prevent them from rotating as additional lengths 1002 are threaded thereon to interconnect a plurality of lengths of casing. The upper ram gates 998 are actuated by cylinder and piston combinations also corresponding with the cylinder and piston combination used to actuate the ram gate 926 but not shown herein. The confronting faces of the separable ram plates come together in surface contact to provide a tight seal between the chamber 900 of the blow-out preventer compartment 114 and the chamber 908 of the well-head compartment 120. The length of casing 1000 has, at its lower end a fishtail bit in the form of sawtooth configurations to provide a drilling action as the casing 1000 is rotated in the earth beneath the submarine C and production tank D. The upper end of the casing 1000 is provided with threads adapted to thread into end adapter 1006 fixed to the adapter pipe 994 in any convenient manner. The casing 1000 is threadedly held by the adapter 1006, and the removable portion 992 of the rotating blow-out preventer 986 is maintained in place on the adapter pipe 994. This assembly is lowered through the rotating blow-out preventer 986 through the telescoping tubes 974–972, through the chuck and blow-out preventer 966, into the position illustrated in FIG. 36. The ram gates 996 are then actuated to close on the upper end of the casing 1000 to hold the casing securely in the position illustrated in FIG. 36. The adapter 1006 is then removed from the upper end of the casing 1000 by rotation of the adapter pipe 994, and it is elevated out of the chamber 900. When the adapter 1006, together with the adapter pipe 994 assembled therewith, is removed from the chuck and blow-out preventer 966 the ram gates 998 are closed by their power actuating mechanism to seal the space between the chamber 900 and the passage 922 through the bottom of the well-head compartment 120. The next length of casing 1002 is then secured to the adapter 1006 in any desired manner as by the use of the automatic casing supply mechanism previously described herein or by other suitable methods. The adapter pipe 994 with the adapter 1006 and the casing 1002 in place is then lowered into the passage 906, the removable portion 992 of the rotating blow-out preventer 986 moving to the assembled position to provide a seal between the passage 906 and the space within the submarine C. The ram gates 998 are then opened and the casing 1002 is lowered into mating engagement with the casing 1000. The adapter pipe 994 is then rotated while the casing 1000 is held in the ram gates 996 to threadedly interconnect the lower end of the casing 1002 with the upper end of the casing 1000. The adapter pipe 994 is then lowered to position the upper end of the length of casing 1002 in alignment with the ram jaws 996. The ram jaws are then actuated to engage the upper end of the casing 1002 whereupon the adapter pipe 994 is rotated in the unthreading direction to release it from the casing 1002. It is then elevated, the ram gates 998 are closed and the above-described sequence of operations of adding another length of casing are repeated. When the casing 1000 approaches the ram gate 930 at the bottom of the well-head compartment 120 the ram gate 930 is opened to permit the casing to pass through. From that point on the ram gate 930 remains open. The ram gates 998 in the chuck and blow-out preventer 966 provide a sealing action between the removable portion 992 of the rotating blow-out preventer 986 to seal out sea water from the space within the submarine C. As additional lengths of casing are added the casing string is rotated whereupon the fishtail bit 1004 carried by the lowermost length of casing 1000 cuts its way into the earth as the casing is progressively seated. The core is left in the casing for future removal in subsequent operations as hereinafter described.

It will be understood that the outer casing thus described only projects into the earth a relatively short distance, possibly eighty to one hundred feet in the average well drilling operation. In specialized circumstances it may be desirable to extend the casing a greater distance, and such operations are within the purview of our invention.

When the outer casing has been extended into the earth a desired distance, as shown in the lower portion of FIG. 37 the last length of the casing 1008 is extended to the bottom of the chamber 908 in the well-head compartment 120 and a sealed packing 1010 is interposed between the upper end of the casing and a boss 1012 at the bottom of the production tank D.

An auxiliary fluid pressure actuated seal 1014 is associated with the sealed packing 1010 to insure against leakage. In the event that leakage occurs in the sealed packing 1010 the seal 1014 may be energized by the addition of fluid pressure therein to prevent leakage during the time the sealed packing 1010 is replaced.

The adapter pipe 994 and the removable portion 992 and the rotating blow-out preventer 986 are removed along with the adapter 1006. The chuck and blow-out preventer 966 is then removed along with the telescoping sealing tubes 972 and 974, one or both of the ram gates 926 and 928 being closed. The chuck and blow-out preventer 966 is then laid to one side in the chamber 900.

A pair of blow-out preventers 1016 and 1018 are then assembled on the boss 970 by suitable bolts or other clamping means. The blow-out preventer 1016 has a pair of lower ram gates 1020 adapted to close to seal the passageway, and a pair of gates 1022 adapted to be clamped around the drill pipe 214 which projects therethrough as hereinafter described.

The blow-out preventer 1018 is provided with a pair of ram gates 1024 adapted to be actuated to clamp on a member of greater diameter than the drill pipe 214. The blow-out preventer 1018 is also provided with a pair of ram gates 1026 of the shear type adapted to be actuated by high pressure mechanism to exert a shearing action for use in an emergency to shear off the drill pipe 214 or any other pipe or casing to prevent the flow of high pressure gases, etc., into the submarine C.

All of the ram gates 1020, 1022, 1024 and 1026 are actuated by fluid pressure actuated cylinder and piston combination as previously described. A rotating blow-out preventer 1028 corresponding with the blow-out preventer 986 is secured to the upper end of the blow-out preventer 1018 and extends into the passage 902 at the top of the chamber 900. A fixed type blow-out preventer 1030 is secured to the boss 990 and has a suitable sealing mechanism to engage the drill pipe 214 or any diameter of pipe therein.

The fixed blow-out preventer 1030 functions to seal the space between the chamber 900 positioned within the blow-out preventer compartment 114 and the space within the submarine C to prevent gases from flowing into the submarine C. Attention is also directed to the fact that in the event that no pipe is in the fixed blow-out preventer 1030 it is capable of closing off completely to prevent gases or liquid from entering the submarine C.

It will be understood that drill pipe 214 is introduced through the fixed blow-out preventer 1030 and the rotatable blow-out preventer 1028 by the automatic pipe handling and connecting mechanism previously described. It will be noted that as the drill pipe 214 is withdrawn, one of the ram gates such, for example as the gate 1020 may be actuated to close the passageway after the pipe has been withdrawn therebeyond. When the pipe is withdrawn from the blow-out preventer 1028 it seals to assist in providing a seal between the submarine and the drill passage. When additional lengths of pipe have been introduced in the drill string as heretofore described the blow-out preventer 1028 is automatically opened as the drill pipe is reinserted therethrough, and the ram gate 1020 may automatically be opened when the drill pipe has passed through the blow-out preventer 1028.

In the performance of a well drilling operation it is necessary, in order to establish a circulation to permit removing the cuttings from the hole, that suitably processed mud be circulated through the drill bit and up through the annulus surrounding the drill pipe 214.

The drill bit used on the drill pipe 214 is slightly smaller than the internal diameter of the casing string 1008. During the drilling operation mud having various additives, such for example as oil base, temperature-resistant and weight additives, is pumped down through the quill 576 which supports the drill pipe 214, the mud being pumped flows out past the cutter and is forced up between the drill pipe 214 and the casing 1008 and is withdrawn through a pipe 1032 and is then directed to the reprocessing stage where the cuttings are removed and analyzed and the desired chemical composition of the mud is restored as by the addition of desired ingredients after which it is again pumped through the quill 576 through the drill pipe 214.

In the performance of a drilling operation the drill pipe will, on occasion, strike into a void or high pressure cavities. When these voids or cavities are encountered the mud being pumped down through the drill string 214 will be dissipated and lost, the circulation of mud which is essential to permit withdrawing the cuttings is then interrupted. When conditions of this nature are encountered it is necessary that the drilling operation be discontinued and that another casing be sunk to seal off the void or cavity.

As shown in FIG. 38 a casing 1034 has been introduced inside of the casing 1008 to seal off a void or cavity in the path of the drilling operation. The drill pipe 214 is withdrawn from the hole and the casing 1034 is connected up and lowered inside of the casing 1008 to a sufficient depth to bridge the void or cavity which has interrupted the circulation of the mud bearing the cuttings.

The telescoping sealing tubes 952 and 954 and the seal 960 are removed from their operative position within the chamber 908 of the well-head compartment 120. A casing landing head 1036 is placed in alignment with the casing 1034, and is secured thereto as by welding. When the casing landing head 1036 has been secured to the casing 1034 the space 1038 between the casing 1034 and the casing 1008 is filled with cement by introducing cement through the center of the casing 1034 and forcing it up between the casings 1034 and 1008 by pressure applied above the column of cement within the casing 1034. When the space 1038 has been completely filled with cement, as evidenced by cement flowing out of the space 1038 at the top thereof, the cementing operation is completed.

The drill pipe 214 is again introduced into the hole within the casing 1034 and the drilling operation progresses. If another cavity or high pressure zone is encountered, another casing 1040 is introduced within the casing 1034, after removal of the drill string. The space between the casing 1040 and the casing 1034 is filled with concrete, the concrete also filling the space surrounding the casing 1040 and the earth formation adjacent thereto as drilled by the drill bit carried by the drill string 214. A tapered slip 1042 is inserted into the casing 1040 and is lowered to the casing landing head 1036. The drill pipe 214 is again inserted into the hole, the pipe 214 fitting within the casing 1040 whereupon the drilling operation is resumed. It will be understood of course that each time a casing is introduced to seal off a blown-out section a smaller diametered drill bit must be used on the drill string 214. It will be noted that another casing landing head 1044 may be assembled with the casing landing head 1036 to receive still another casing if a subsequent blown-out section is encountered.

Attention is directed to the fact that it is unnecessary to introduce cement all the way to the surface between casing members introduced subsequent to the introduction of the first casing 1034. For example, when the casing 1040 is introduced it is only necessary to insert a sufficient quantity of cement to provide adequate support for the landed casing. This may be only a matter of a few hundred feet.

An auxiliary fixed blow-out preventer 1046 may be assembled on the casing landing head 1044 to seal the space between the down hole passage and the chamber 908 within the well-head compartment 120 in the event that it is desired to withdraw the drill string to permit the removal of the submarine C from the production tank D, leaving the production tank in place for some period of time.

Attention is directed to the fact that at the time the blow-out preventer 1046 is positioned in place, a sleeve casing 1048 is secured between the blow-out preventer 1046 and the blow-out preventer 1016 positioned in the chamber 900. Suitable seal packing members 1050 and 1052 are interposed between the sleeve 1048 and the bosses 964 and 970 to thus provide increased sealing against the access of sea water from the space 1054 between the submarine C and the production tank D.

It will be noted that auxiliary fluid pressure operated seals 1056 and 1058 may be used in association with the packing members 1050 and 1052 to insure auxiliary protection in the event that a leak should be encountered. These seals 1056 and 1058 may be inflated to hold back water or gas to permit replacement of the packing members 1050 and 1052.

Referring now to FIG. 39 it will be noted that the completion system is illustrated. The completion system is illustrated in the chamber 908 of the production tank D. A casing 1008 is illustrated with additional casing members carried by the casing landing head 1036 and by the casing landing head 1044. As shown here an additional casing member is carried by an additional casing landing head 1060. A cross 1062 supports an oil string extending downwardly the full depth of the hole within the smallest diametered casing landed in the casing landing head 1060. The space between the oil string carried by the cross 1062 and the smallest casing carried by the casing landing head 1060 is cemented all the way up. An oil tubing string carried by a flow fitting 1064 having an adjustable flow control mechanism 1066 to control the rate of flow of oil through an outlet passage 1068 to the receptacles in the production tank D. A vent line 1070 extending into the cross 1062 is provided to vent the space between the oil string carried by the cross 1062 and the tubing string carried by the fitting 1064. Additional vents 1072 and 1074 are provided to vent the space between other of the casing members. When the assembly has been connected up as shown here, the ram gate 928 is closed and the submarine C can leave the production tank D nestled on the ocean floor, oil flowing from the outlet passage 1068 into the respective chambers 132 of the production tank D. This oil may be periodically withdrawn as heretofore described in connection with the co-pending application Serial No. 753,673, filed August 7, 1958 by Joseph V. O'Neill and George Homanick.

We claim:

1. In a well drilling apparatus the combination comprising a vertically traveling mechanism for suspending a drill string in a well hole during a well drilling operation, means releasably connected with said vertically traveling mechanism for supplying mud to the drill string, said mud supply means comprising a mud supply cylinder arranged above the vertically traveling mechanism, and a mud tube slidably extended from said cylinder into connection with said vertically traveling mechanism.

2. The combination comprising a vertically traveling annular drill head having a pipe gripper for suspending a drill string within a well hole during a drilling operation, and a removable connection between said head and said pipe gripper for permitting said pipe gripper to be moved out of an obstructing position for passage of pipe axially through the annular head.

3. The combination comprising an annular vertically traveling drill head, a rotary pipe gripper device removably carried by said drill head for suspending a drilling string during a well drilling operation, mud supply means for the drill string comprising a mud tube having a removable connection with said drill head, and a pipe-receiver positioned above said drill head, whereby said mud tube and pipe gripper device may be removed from connection with the drill head to permit passage therethrough of drill pipe during a string-disconnecting operation.

4. The combination comprising a vertically traveling annular drill head having a central vertical passage therethrough, a powered pipe gripper device removably supported on said drill head for suspending a drill string in a well hole during a well drilling operation, mud supply means for said drill string comprising a mud tube having a removable connection with said head, pipe-receiving means positioned above said head, and a vertically traveling carrier mechanism positioned below said head, whereby said mud tube and rotary gripper device may be disconnected from the drilling head to expose said central passage therethrough for accommodating drill pipe during a drill string disconnecting operation, said drill string disconnecting operation being effected by movement of said pipe carrier means upwardly to position a disconnected pipe in the receiver means.

5. The combination comprising a vertically traveling drill head having a rotatably powered pipe gripper means removably carried thereon for suspending a drill string in a well hole during a well drilling operation, a carrier mechanism positioned below said drilling head, and means forming a releasable connection between the drill head and carrier means for allowing said drill head to move the carrier means vertically during a drill string disconnecting operation.

6. The combination comprising a vertically traveling drill head having a rotary pipe gripper device removably supported thereon for normally suspending a drill string in a well hole during a well drilling operation, carrier means positioned below said drill head, means forming a releasable connection between the drill head and carrier means for allowing said drill head to support said carrier means during a drill string disconnecting operation, said carrier means having a first chuck structure for engaging one pipe in the string, a second chuck structure for engaging a subjacent pipe in the string, and power means for rotating one of said chuck structures during a drill string disconnecting operation to cause the first-mentioned pipe to be disconnected from the drill string.

7. The combination comprising a vertically traveling drill head having a powered pipe gripper device removably carried therein for normally suspending a drill string in a well hole during a well drilling operation, carrier means having a removable connection with the drill head for causing said drill head to support the carrier means during a drill string disconnecting operation, said carrier means having a first chuck for gripping one pipe in a drill string, a second chuck for gripping a lower pipe in the string, and power means for rotating one of said chucks to separate the first mentioned pipe from the string, and a pipe-receiver positioned above said drill head for accepting the disconnected pipe from the carrier means when said drill head and carrier means are moved toward said receiver.

8. Well drilling apparatus for manipulating a drill string having a series of drill pipes coupled to each other comprising a frame, a first chuck mounted on said frame, means for actuating said first chuck to selectively grip and support said drill string or to release said drill string to permit movement of said drill string through said first chuck, a drill head mounted on said frame for vertical movement coaxially of said drill string between a lowered position adjacent said first chuck and an elevated position spaced vertically above said first chuck by a distance substantially equal to the length of a pipe of said drill string, a second chuck releasably coupled to said drill head and operable to selectively grip and support said drill string or to release said drill string to permit movement of said drill string coaxially through said second chuck and said drill head, means for raising and lowering said drill head between said lowered and said elevated positions, and control means for actuating said chucks to engage both of said chucks with said drill string to grip said drill string simultaneously when said drill head is at either of said lowered or elevated positions and to release on of said chucks during movement of said drill head in one direction and to release the other of said chucks during movement of said drill head in the opposite direction.

9. Apparatus as defined in claim 8 further comprising means on said second chuck operable to couple or uncouple drill pipe during movement of said drill head.

10. Apparatus as defined in claim 8 further comprising transfer means electively operable to receive pipe from said drill head when said drill head is in said elevated position.

11. Apparatus as defined in claim 9 wherein said control means for actuating said chucks is operable to release said first chuck during upward movement of said drill head, means on said second chuck for uncoupling the uppermost pipe in said string from the next uppermost pipe during movement of said drill head toward said elevated position, and means operable upon arrival of said drill head at said elevated position for transferring the uncoupled uppermost pipe from said second chuck to said transfer means.

12. The method of disassembling drill pipe from a drill string comprising the steps of coupling a first chuck to a vertically movable drill head, gripping the uppermost pipe of the drill string with said first chuck to suspend the drill string therefrom, elevating the drill head and first chuck to elevate the drill string until the next lowermost pipe in said drill string has been raised into alignment with a second chuck, gripping said next lowermost pipe with said second chuck and releasing said first chuck to transfer suspension of said string from said drill head and first chuck to said second chuck, lowering said drill head and first chuck and gripping said next lowermost pipe with said first chuck at a location below the joint between the uppermost pipe and next uppermost pipe of said drill string, releasing said second chuck to transfer suspension of said string back to said first chuck, elevating said drill head and first chuck with said string suspended therefrom, and uncoupling the uppermost pipe of said string from said next uppermost pipe during the last mentioned elevating movement of said drill head.

References Cited by the Examiner

UNITED STATES PATENTS

| | | | |
|---|---|---|---|
| 2,633,333 | 3/1953 | Storm | 175—85 X |
| 2,803,434 | 8/1957 | Heinish | 175—85 X |
| 2,848,196 | 8/1958 | Simmonds | 175—85 X |
| 2,998,084 | 8/1961 | Johnson et al. | 175—85 |
| 3,002,560 | 10/1961 | Paget | 175—85 X |
| 3,076,245 | 2/1963 | Acker | 24—263.5 |
| 3,099,323 | 7/1963 | Kelley | 175—85 |
| 3,122,811 | 3/1964 | Gilreath | 24—263.5 |
| 3,158,211 | 11/1964 | McCue et al. | 175—85 |
| 3,158,212 | 11/1964 | Fanshawe et al. | 175—85 |
| 3,194,313 | 7/1965 | Fanshawe | 175—85 |

CHARLES E. O'CONNELL, *Primary Examiner.*

R. E. FAVREAU, *Assistant Examiner.*